United States Patent
Reynolds et al.

(10) Patent No.: US 8,904,036 B1
(45) Date of Patent: Dec. 2, 2014

(54) SYSTEM AND METHOD FOR ELECTRONIC SECURE GEO-LOCATION OBSCURITY NETWORK

(75) Inventors: James Andrew Reynolds, Ashburn, VA (US); Philip Desch, Ashburn, VA (US); Brett Burley, Waterford, VA (US); Gene Ward, Manassas, VA (US); Joe Kenny, Aldie, VA (US); Michael Howland, Middleburg, VA (US); Christopher Allen Howland, Washington, DC (US)

(73) Assignee: Chickasaw Management Company, LLC, Reston, VA (US)

( * ) Notice: Subject to any disclaimer, the term of this patent is extended or adjusted under 35 U.S.C. 154(b) by 790 days.

(21) Appl. No.: 12/803,030

(22) Filed: Dec. 7, 2010

(51) Int. Cl.
H04L 12/56 (2006.01)
G06F 15/173 (2006.01)
H04L 9/00 (2006.01)
H04L 12/00 (2006.01)
G06F 15/00 (2006.01)

(52) U.S. Cl.
USPC ............ 709/238; 380/28; 380/30; 380/59; 709/227; 709/228; 709/239; 713/150; 713/153; 726/1; 726/2; 726/3; 726/11; 726/12; 726/13; 726/14; 726/15; 726/26

(58) Field of Classification Search
USPC ........ 380/255, 259, 28–30, 59, 287; 370/351, 370/389, 392, 464–467, 474; 709/223, 709/227–229, 238–244; 713/150, 153, 154, 713/160; 726/1–15, 26, 34
See application file for complete search history.

(56) References Cited

U.S. PATENT DOCUMENTS

| | | | | |
|---|---|---|---|---|
| 5,550,984 A | * | 8/1996 | Gelb | 370/466 |
| 5,633,932 A | * | 5/1997 | Davis et al. | 380/30 |
| 6,128,298 A | * | 10/2000 | Wootton et al. | 370/392 |
| 6,266,704 B1 | * | 7/2001 | Reed et al. | 709/238 |
| 6,751,729 B1 | * | 6/2004 | Giniger et al. | 713/153 |
| 6,856,624 B2 | * | 2/2005 | Magret | 370/392 |
| 6,978,308 B2 | * | 12/2005 | Boden et al. | 709/229 |
| 6,986,036 B2 | * | 1/2006 | Wang et al. | 713/153 |
| 7,023,879 B1 | * | 4/2006 | Sitaraman et al. | 370/466 |
| 7,155,740 B2 | * | 12/2006 | Brustoloni | 726/15 |
| 7,590,245 B1 | * | 9/2009 | Levitan | 726/12 |
| 2006/0262808 A1 | * | 11/2006 | Lin et al. | 370/466 |

FOREIGN PATENT DOCUMENTS

| | | | | |
|---|---|---|---|---|
| EP | 1653675 A1 | * | 5/2006 | H04L 12/56 |
| WO | WO2005/096556 A1 | * | 10/2005 | H04L 12/56 |
| WO | WO2005/119978 A1 | * | 12/2005 | H04L 12/56 |
| WO | WO2006/-156614 A1 | * | 2/2006 | H04L 12/46 |

* cited by examiner

Primary Examiner — Bernarr Gregory
(74) Attorney, Agent, or Firm — Alchemy-Partners, PC

(57) ABSTRACT

Described are a secure geo-location obscurity network and ingress nodes, transit nodes and egress nodes used in such a network. In particular, a novel device is provided and comprises: a node for a network, the node comprising: a private portion for allowing high bandwidth secure private traffic to be received and transmitted by the node on a private pathway through the node; and a public portion for allowing low bandwidth secure public traffic to be received and transmitted by the node on a plurality of public pathways through the node.

17 Claims, 19 Drawing Sheets

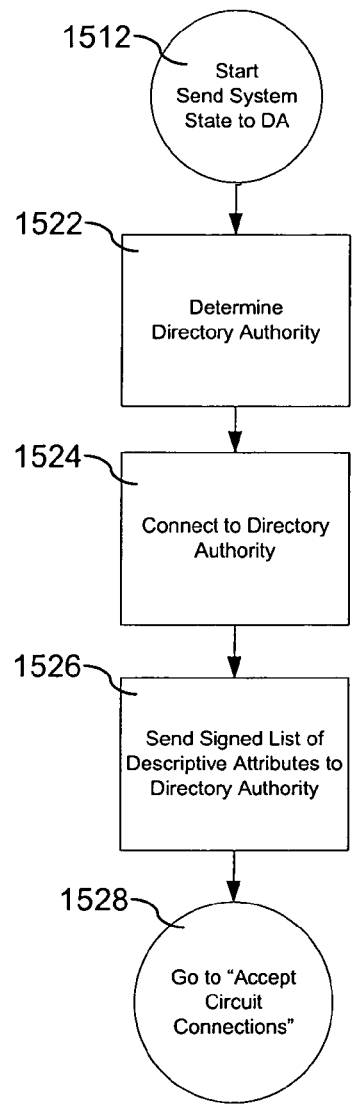 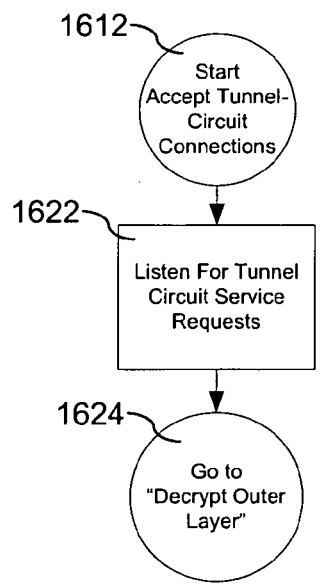
*FIG. 15*     *FIG. 16*

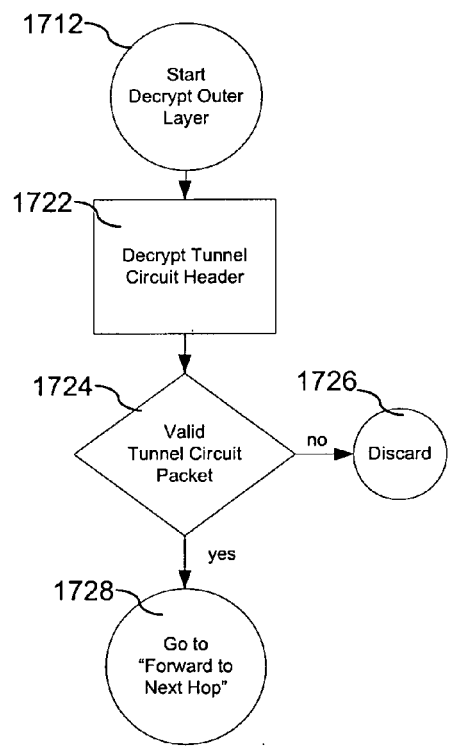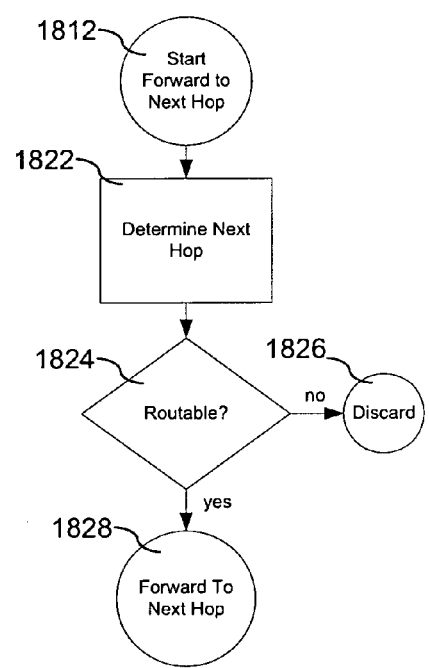
FIG. 17
FIG. 18

SYSTEM AND METHOD FOR ELECTRONIC SECURE GEO-LOCATION OBSCURITY NETWORK

BACKGROUND

1. Field of the Invention

The present invention relates generally to computer hardware and software privacy and, more particularly, to the means of electronically masking the geographic location of physical computer hardware.

2. Related Art

Today, nearly every computer has the capability to communicate over the Internet. Most commonly, the Internet is used today to allow a client at its origin to query information on a server (target). This typically is in the form of a personal computer or device accessing information on a server at another location. One of the drawbacks of Internet communication is the capability of third parties to monitor and even imitate communication between the client and server. Third parties also have the capability to discover the actual physical location of both client and server devices, a capability that may be undesirable for a user. This information can be acquired via the information sent between client and server by unauthorized users.

SUMMARY

According to a first broad aspect of the present invention, there is provided a device comprising: a node for a network, the node comprising: a private portion for allowing high bandwidth secure private traffic to be received and transmitted by the node on a private pathway through the node; and a public portion for allowing low bandwidth secure public traffic to be received and transmitted by the node on a plurality of public pathways through the node.

According to a second broad aspect of the present invention, there is provided a device comprising: an ingress node comprising: a tunnel circuit builder module for building a tunnel circuit from the ingress node to an egress node; an ingressing user data redirection module for redirecting the traffic from a client node to the tunnel circuit and for encrypting the traffic to form encrypted traffic; and a send/receive module for sending traffic to and receiving traffic from the tunnel circuit; wherein the tunnel circuit comprises a random route path through a plurality of randomly selected public-private transit nodes.

According to a third broad aspect of the present invention, there is provided a device comprising: an egress node comprising: an egress tunnel builder module for receiving the request for building an egress tunnel from the egress node to a server node; a traffic redirection module for redirecting encrypted traffic from a tunnel circuit to the egress tunnel and for decrypting the encrypted traffic from the tunnel circuit; and a send/receive module for sending the decrypted traffic from the egress node to the server node through the egress tunnel.

According to a fourth broad aspect of the present invention, there is provided a method comprising the following steps: (a) forming a tunnel circuit from an ingress node to an egress node for traffic from a client node connected to the ingress node; (b) forming an egress tunnel from the egress node to a server for the traffic; and (c) transmitting the traffic from the client node to the egress node; wherein the egress tunnel is an inner tunnel of a double tunnel; and wherein the tunnel circuit is an outer tunnel of the double tunnel.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the invention.

FIG. 15 is a flowchart illustrating the operation of a system state module of one of the public-private transit nodes of FIG. 10;

FIG. 16 is a flowchart illustrating the operation of a circuit connection acceptance module of one of the public-private transit nodes of FIG. 10;

FIG. 17 is a flowchart illustrating the operation of a private circuit builder module of one of the public-private transit nodes of FIG. 10;

FIG. 18 is a flowchart illustrating the operation of a forwarding module of one of the public-private transit nodes of FIG. 10;

DETAILED DESCRIPTION OF THE PREFERRED EMBODIMENTS

Definitions

Figure 1:
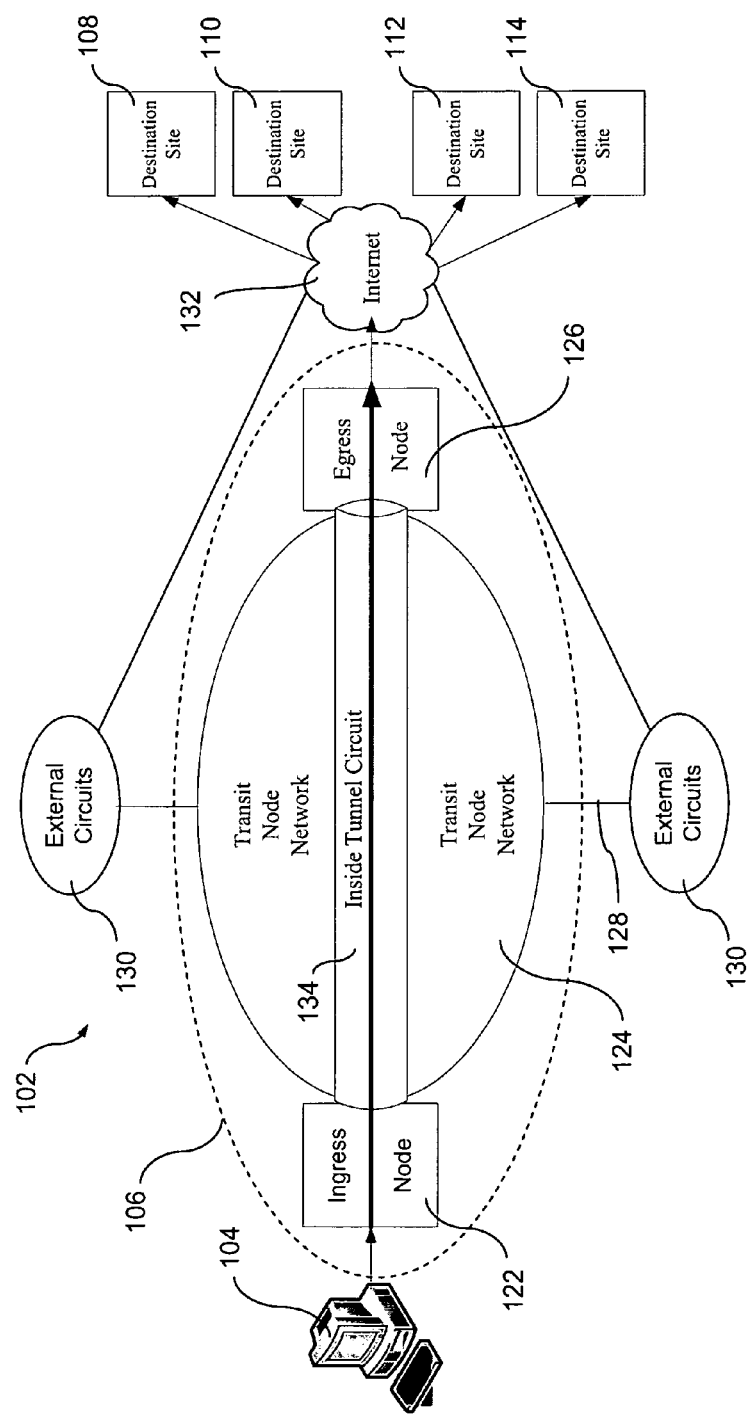
FIG. 1 is a schematic diagram of a secure geo-location obscurity network according to one embodiment of the present invention.

Where the definition of terms departs from the commonly used meaning of the term, applicant intends to utilize the definitions provided below, unless specifically indicated.

For the purposes of the present invention, directional terms such as "top," "bottom," "upper," "lower," "above," "below," "left," "right," "horizontal," "vertical," "upward," "downward," etc., are merely used for convenience in describing the various embodiments of the present invention.

For the purposes of the present invention, the term "adversary" refers to a human who may either intentionally or unintentionally undermine the confidentiality, integrity, and/or availability of private electronic information.

For the purposes of the present invention, the term "client device" refers to electronic devices that may be used to access a data network or a communication network. Examples of client devices include: personal computers, personal data assistants, cell phones, laptops, tablet computers, handheld gaming devices, video game players, etc. When an ingress node is part of a separate device that is not part of a client device, the terms "client device" and "client node" may be used interchangeably. However, in some embodiments of the present invention, such as that illustrated in FIG. 7, the client device may include a "client node" and an "ingress node."

For the purposes of the present invention, the term "data storage medium" or "storage medium" refers to any medium or media on which data may be stored for use by a computer system. Examples of data storage media include floppy disks, Zip™ disks, CD-ROM, CD-R, CD-RW, DVD, DVD-R, flash memory, hard disks, optical disks, etc.

For the purposes of the present invention the term "destination" or "server" refers to the final termination point of the communication circuit initiated by a client application (e.g. web browser). When an egress node is part of a separate device that is not part of a server, the terms "server" and "server node" may be used interchangeably. However, in some embodiments of the present invention, such as that illustrated in FIG. 7, the server may include a "server node" and an "egress node."

For the purposes of the present invention, the term "double tunnel" refers to wrapping one logically and cryptographically discrete information circuit (an "inner tunnel," also referred to as the "egress tunnel") within another logically and cryptographically discrete information circuit (the "outer tunnel," also referred to as the tunnel circuit). In the double tunnel of the present invention, there are two (2) different encryptions: (1) point-to-point (node-to-node) encryption for the outer tunnel (the tunnel circuit) and (2) end-to-end (ingress-to-egress) encryption for the inner tunnel (the egress tunnel) that is passed inside the node-to-node encryption.

For the purposes of the present invention, the term "egress node" refers to a node that reroutes encrypted traffic from a tunnel circuit to a server node and decrypts the encrypted traffic prior to sending the traffic to the server node. An egress node may be part of a separate device or may be part of a server including the server node.

For the purposes of the present invention, the term "external circuit" refers to any circuit that is not propagated through the private components of this invention.

For the purposes of the present invention, the term "forward-looking mechanism" refers to the ability to locally manipulate circuit path creation decisions made by remote network components.

For the purposes of the present invention, the term "hardware and/or software" refers to functions that may be performed by digital software, digital hardware, or a combination of both digital hardware and digital software.

For the purposes of the present invention, the term "hidden service" refers to a client-server application hosted within the private geo-obscured transit system (GOTS) domain and made available to authorized clients, without the need to reveal the availability of the service to unauthorized clients.

For the purposes of the present invention, the term "high bandwidth" refers to the allocation of a larger portion of a shared finite aggregate bandwidth resource to one pathway in comparison to one or more low bandwidth pathways.

For the purposes of the present invention, the term "ingress node" refers to a node that reroutes traffic from a client node to a tunnel circuit and encrypts the traffic prior to sending the traffic to the tunnel circuit. An ingress node may be part of a separate device or may be part of a client device including the client node.

For the purposes of the present invention, the term "local mechanism" refers to logical controls of the system that exist within the local operating environment of the individual components of which the invention is composed.

For the purposes of the present invention, the term "logically adjacent node" refers to the node from which a given node receives private traffic and the node to which a given node sends private traffic. A tunnel circuit of the present invention is an ordered series of logically adjacent nodes.

For the purposes of the present invention, the term "low bandwidth" refers to the allocation of a smaller portion of a shared finite aggregate bandwidth resource to one or more pathways in comparison to a larger portion being allocated to a high bandwidth pathway.

For the purposes of the present invention, the term "mesh network" refers to having all routing nodes connected to all other routing nodes within the same network.

For the purposes of the present invention, the term "network" refers to a telecommunications system used to send and receive data.

For the purposes of the present invention, the term "obscuring protocol" refers to an overt protocol that conceals hidden communication.

For the purposes of the present invention, the term "onion router" refers to a device that employs multiple layers of encryption in order to provide confidentiality and anonymity.

For the purposes of the present invention, the terms "private data stream," "private internal data stream" and "private traffic" refer to internal network communications intended to be hidden from public view.

For the purposes of the present invention, the term "private ingress node" refers to an ingress node that is connected to other nodes only by private connections.

For the purposes of the present invention, the term "public-private egress node" refers to an egress node that is a public-private node.

For the purposes of the present invention, the term "public-private transit node" refers to a transit node that is a public-private node.

For the purposes of the present invention, the terms "public data stream," "public external data stream" and "public traffic" refer to network communications originated from any public network, e.g., the Internet.

For the purposes of the present invention, the term "public-private node" refers to a node including a private portion for sending and receiving secure private traffic and a public portion for sending and receiving secure public traffic. A public-private node may or may not include a throttle for adjusting the size of the public and/or private portions of the public-private node.

For the purposes of the present invention, the terms "randomly relay traffic" and "randomly route traffic" refer to using methods that forward traffic through different communications paths that cannot be easily predicted.

For the purposes of the present invention, the term "steganographic technique" refers to any technique or protocol that hides a concealed message in an unconcealed, overt message.

For the purposes of the present invention, the term "throttle" refers to the controlled suppression of network traffic to conserve network resources.

For the purposes of the present invention, the term "traffic" refers to traffic, one or more pieces of data, one or more data streams or one or more communications travelling through a network.

For the purposes of the present invention, the term "traffic analysis" refers to the examination of network traffic in order to find specific information.

For the purposes of the present invention, the term "traffic analysis attack" refers to examination of network traffic with an intent to obtain identifying or otherwise private information about the end user that would not be overtly available.

For the purposes of the present invention, the term "traffic mixing" refers to a server node acting as a proxy for multiple random data streams from many physically distributed locations that will proxy their traffic through the server, thereby making it difficult for any person who might want to track the origin of the sender.

For the purposes of the present invention, the term "traffic shaping" refers to the ability for a server node to give higher priority of throughput to selected data streams and to give lower priority of throughput to the other data streams.

For the purposes of the present invention, the term "transactional data" refers to data that is transmitted from one server node to the other.

For the purposes of the present invention, the term "transit node" refers to a transit node/router whose sole purpose is to route traffic through it to another transit node or an egress node using a secure communications channel (but traffic will not be egressed outside the secure communications channel).

For the purposes of the present invention, the term "tunnel circuit" refers to an end-to-end encrypted secure connection between an ingress node, two or more transit nodes and an egress node. A tunnel circuit of the present invention is an ordered series of logically adjacent nodes.

DESCRIPTION

Currently, there are well-known methods and systems available that allow users to communicate over the Internet anonymously in an attempt to eliminate eavesdropping by third parties. One such system aims to protect its users against traffic analysis attacks in which volunteers operate a network of onion routers that enable anonymous outgoing connections and anonymous "hidden" services. This technology is known as Tor™ (The Onion Router).

Some known drawbacks to prior art Tor™ technology, however, are: (1) users have leakage of data from the user's computer that poses a security threat, (2) users have little control over the routers in which their traffic is being passed, (3) the possibility of security attacks on the routers and (4) the limitation to certain communication protocols that causes potential error on the users' part in staying anonymous. Given the desire of some users to be truly anonymous on the Internet, Tor™ is an impractical solution and the anonyminity is not truly achieved.

The present invention overcomes the above-identified shortcomings by providing communication to third-party systems by means of obscuring the true origin of the initiating user. In one embodiment, the present invention provides a series of transit nodes to randomly relay and route communications traffic. In one embodiment of the present invention, private/secure internal data streams and public external data streams are mixed together using steganographic techniques to cover intentions of attempted anonymity. In one embodiment of the present invention, performance and availability of private streams is ensured by using a traffic shaping technique. In one embodiment of the present invention, a double tunnel technique is used to hide the true origin of a data stream, thereby enhancing the confidentiality of the data stream.

FIG. 1 shows a secure geo-location obscurity network (SGLON) 102 according to one embodiment of the present invention. SGLON includes a client device 104, a geo-obscured transit system (GOTS) 106, and destination sites 108, 110, 112 and 114. GOTS 106 includes a private ingress node 122, a private transit node network 124 and a public-private egress node 126. Private transit node network 124 comprises public-private transit nodes that are connected to each other by high bandwidth secure connections. The public-private transit nodes of private transit node network 124 are also connected by less secure lower bandwidth connections 128 to less secure nodes in external circuits 130 that are connected to the Internet 132. A number of the public-private transit nodes of private transit node network 124 form an inside tunnel circuit 134 between private ingress node 122 and public-private egress node 126. That is, the public-private transit nodes form a secure pathway between private ingress node 122 and public-private egress node 126 that is unaffected by data/communication in external circuits 130 and between external circuits 130 and the public-private transit nodes of private transit node network 124. Client device 104 is connected to ingress node 122. Destination sites 108, 110, 112 and 114 are connected through the Internet 132 to public-private egress node 126.

Figure 2:
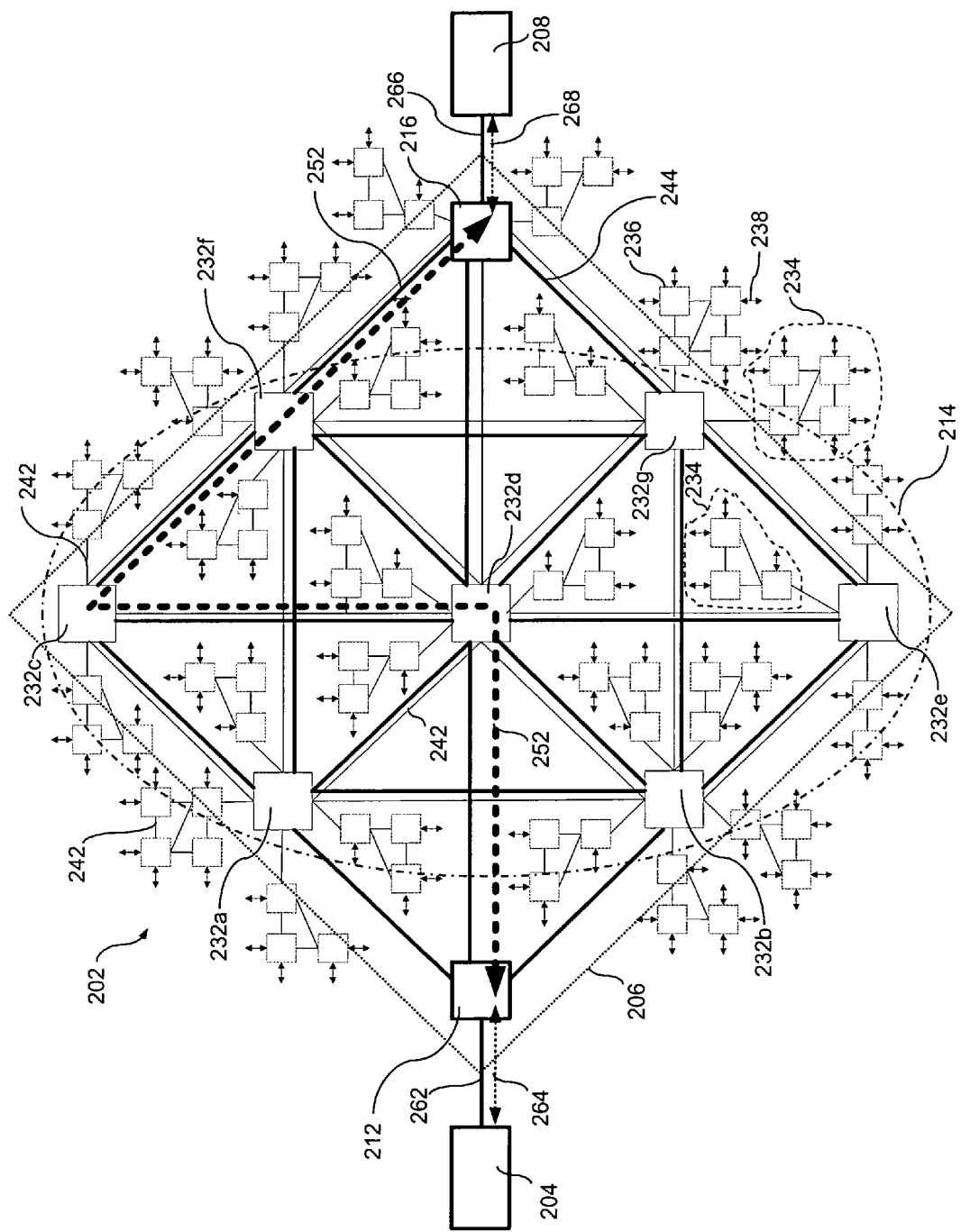
FIG. 2 is a schematic diagram of part of a secure geo-location obscurity network according to one embodiment of the present invention showing an inside tunnel circuit from a source/client device to a destination/server.

FIG. 2 shows part of an SGLON 202 according to one embodiment of the present invention. SGLON 202 includes a source/client device 204, a GOTS 206 and a destination/server 208. GOTS 206 includes a private ingress node 212, a public-private transit node network 214 and a public-private egress node 216. Source/client device 204 is connected to private ingress node 212. Destination/server 208 is connected to public-private egress node 216. Private transit node network 214 comprises public-private transit nodes 232a, 232b, 232c, 232d, 232e, 232f and 232g. Private transit node network 214 and public-private egress node 216 are embedded in and connected to public external circuits 234 consisting of public nodes 236 (shown as small boxes). Double-headed arrows 238 show that public nodes 236 are connected to additional public nodes, not shown in FIG. 2, of public external circuits 234. Public connections 242 connect public-private transit nodes 232a, 232b, 232c, 232d, 232e, 232f and 232g with each other, connect public-private transit nodes 232a, 232b, 232c, 232d, 232e, 232f and 232g with public nodes 236 and connect public nodes 236 with each other. Public-private transit nodes 232a, 232b, 232c, 232d, 232e, 232f and 232g are connected with each other and also with public-private egress node 216 by private connections/attachments 244. Private connections/attachments 244 are shown with thick lines to indicate high bandwidth allocation. Public connections 242 are shown with thinner lines to indicate lower bandwidth allocation. High bandwidth private traffic travels from private ingress node 212 to public-private egress node 216 in an inside tunnel circuit, shown by thick dashed arrow 252, which comprises private connections/attachments 244 between public-private transit nodes 232d, 232c and 232f. In the tunnel circuit shown by thick dashed arrow 252, public-private transit node 232d is logically adjacent to public-private transit node 232c, public-private transit node 232c is logically adjacent to public-private transit nodes 232d and 232f and public-private transit node 232f is logically adjacent to public-private transit node 232c. High bandwidth private traffic enters private ingress node 212 from source/client device 204 over a private connection 262 as shown by thin dashed arrow 264. High bandwidth private traffic is sent by public-private egress node 216 to destination server 208 over a private connection 266 as shown by thin dashed arrow 268. Private traffic travels in both directions through inside tunnel circuit and over private connections 262 and 266 as shown by double-headed dashed arrows 252, 264 and 268, respectively.

For simplicity of illustration, not all of the private connections/attachments between public-private transit nodes are shown in FIG. 2. In one embodiment of the present invention, every public-private transit node of a private transit node network is securely connected/attached to every other public-private transit node in the public-private transit node network. Also, every public-private transit node may be securely connected to the private ingress node and/or the public-private egress node. For simplicity, in the discussion below, it will be assumed that all of the security transit nodes of the security transit node network are securely connected to each other and to the private ingress node and the public-private egress node. However, this may not be the case in all embodiments of the present invention.

Also, for simplicity of illustration, only a limited number of public nodes and public connections are shown in FIG. 2. For example, there may be millions or billions of public nodes in a network. Also, each public-private transit node, public-private egress node or public node may have many public connections to other nodes in the network.

In a GOTS of the present invention, such as the GOTS shown in FIG. 2, the private ingress node, the public-private transit nodes, and the public-private egress node work in concert to provide traffic mixing and traffic shaping. A successful traffic analysis attack may reveal various characteristics of networking activity that may be helpful to an adversary. Traffic mixing is employed by the GOTS to mitigate the risk of traffic analysis in those areas where GOTS traffic may be observable to an adversary. In FIG. 2, the concept of traffic mixing is illustrated by the external circuits and the inside tunnel circuit simultaneously converging on and diverging from the public-private transit nodes and the public-private egress node. The way traffic mixing is accomplished is a defining characteristic of the GOTS solution. A GOTS achieves traffic mixing by simultaneously running multiple instances of an obscuring protocol on all ingress, transit and egress nodes. Of the multiple instances of the obscuring protocol, one instance is private and used for the inside tunnel circuit and, depending on the level of traffic mixing required, one or more instances of the obscuring protocol remains available for public use. As a direct result of the GOTS, traffic mixing, private, inside tunnel circuit traffic is hidden within much larger amounts of public traffic, and mitigating the risk of traffic analysis. Traffic mixing produces large volumes of network traffic, a byproduct that must be managed in order to ensure that the limited resources of the GOTS nodes, i.e., public-private transit nodes and public-private egress nodes are always available and biased toward the inside tunnel circuit. To this end, a GOTS utilizes a technique known as traffic shaping.

The method in which a GOTS achieves traffic shaping is distinct in that it employs both forward-looking and local mechanisms. The obscuring protocol inherently accommodates forward-looking traffic shaping through parameters that are used to essentially advertise to the public the amount of bandwidth they will be allocated through the GOTS, subsequently affecting public users' circuit provisioning decisions. Local mechanisms for traffic shaping operate at the kernel-level of the operating system, allocating bandwidth to certain TCP and/or UDP services and IP addresses. Specifically, the local mechanisms are tuned to reserve the bulk of available bandwidth for the inside tunnel circuit.

One additional, important concept represented within FIG. 2 is the ability of GOTS to dynamically provision the inside tunnel circuit. Using heuristic mechanisms and various configuration parameters, a GOTS dynamic provisioning helps ensure high availability and high performance of the inside tunnel circuit. The public-private transit node network is a mesh network created by having every node attached to every other node within the GOTS environment. These attachments are created logically, not physically, across the Internet. An inside tunnel circuit is then established across these logical attachments heuristically based on node availability (i.e., online), node reliability (i.e., uptime), and performance (i.e., throughput levels) characteristics, as well as other biasing parameters that may be set manually, resulting in optimal routing of the inside tunnel circuit.

Figure 3:
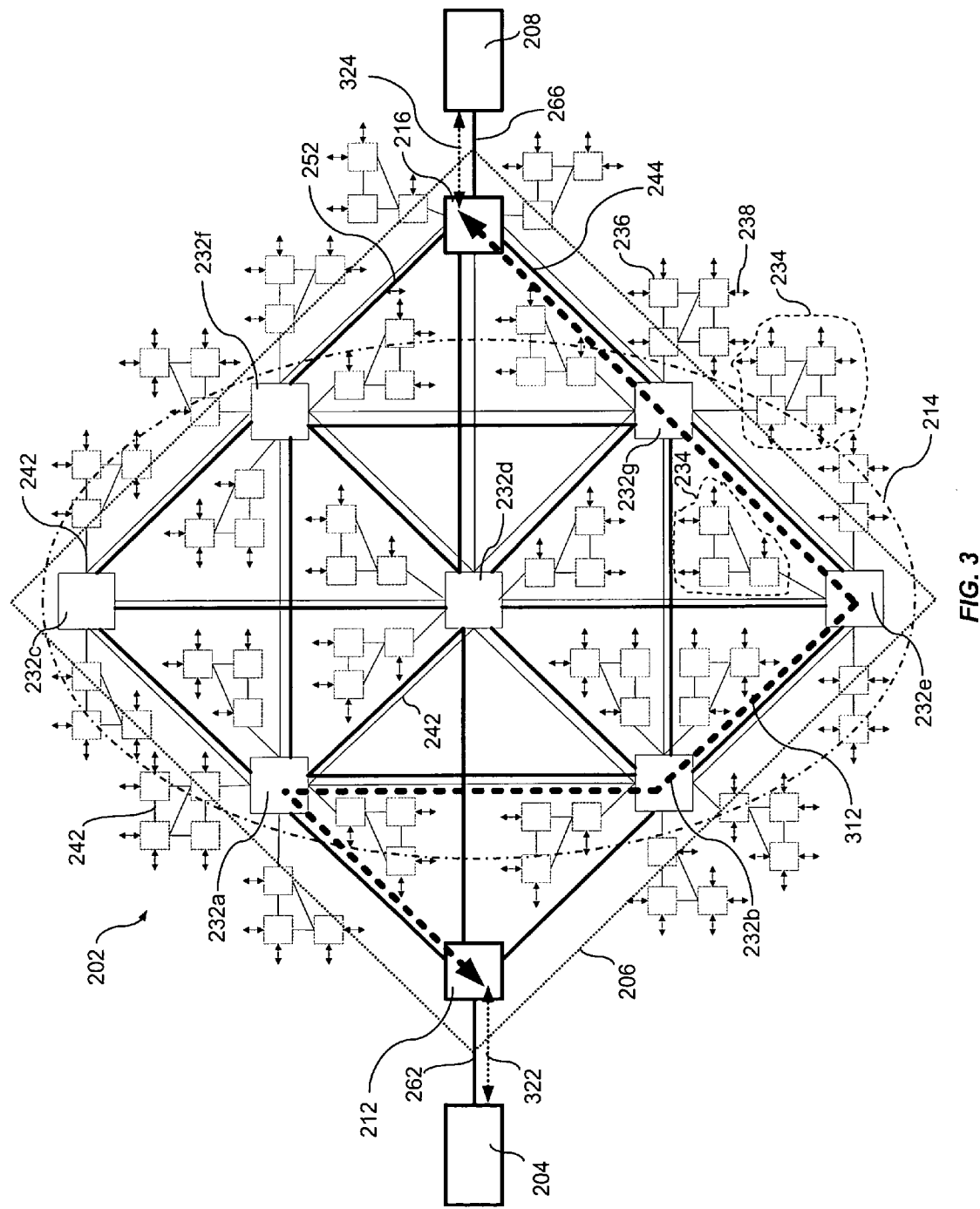
FIG. 3 a schematic diagram of part of the secure geo-location obscurity network of FIG. 2 showing an inside tunnel circuit from a destination/server to a source/client.

FIG. 3 shows one example of an inside tunnel circuit, shown by thick dashed arrow 312, for high bandwidth private traffic that travels between source/client device 204 and destination/server 208 that passes through public-private transit nodes 232a, 232b, 232e and 232g, none of which are passed through by the inside tunnel circuit of FIG. 2. As shown in FIG. 3, the high bandwidth private traffic may travel in both directions between source/client device 204 and destination/server 208. High bandwidth secure traffic enters private ingress node 212 from source/client device 204 over private connection 262 as shown by thin dashed arrow 322. High bandwidth secure traffic is sent by public-private egress node 216 to destination server 208 over private connection 266 as shown by thin dashed arrow 324. In the tunnel circuit shown by thick dashed arrow 312, public-private transit node 232a is logically adjacent to public-private transit node 232b, public-private transit node 232b is logically adjacent to public-private transit nodes 232a and 232e, public-private transit node 232e is logically adjacent to public-private transit nodes 232b and 232g and public-private transit node 232g is logically adjacent to public-private transit node 232e.

Figure 4:
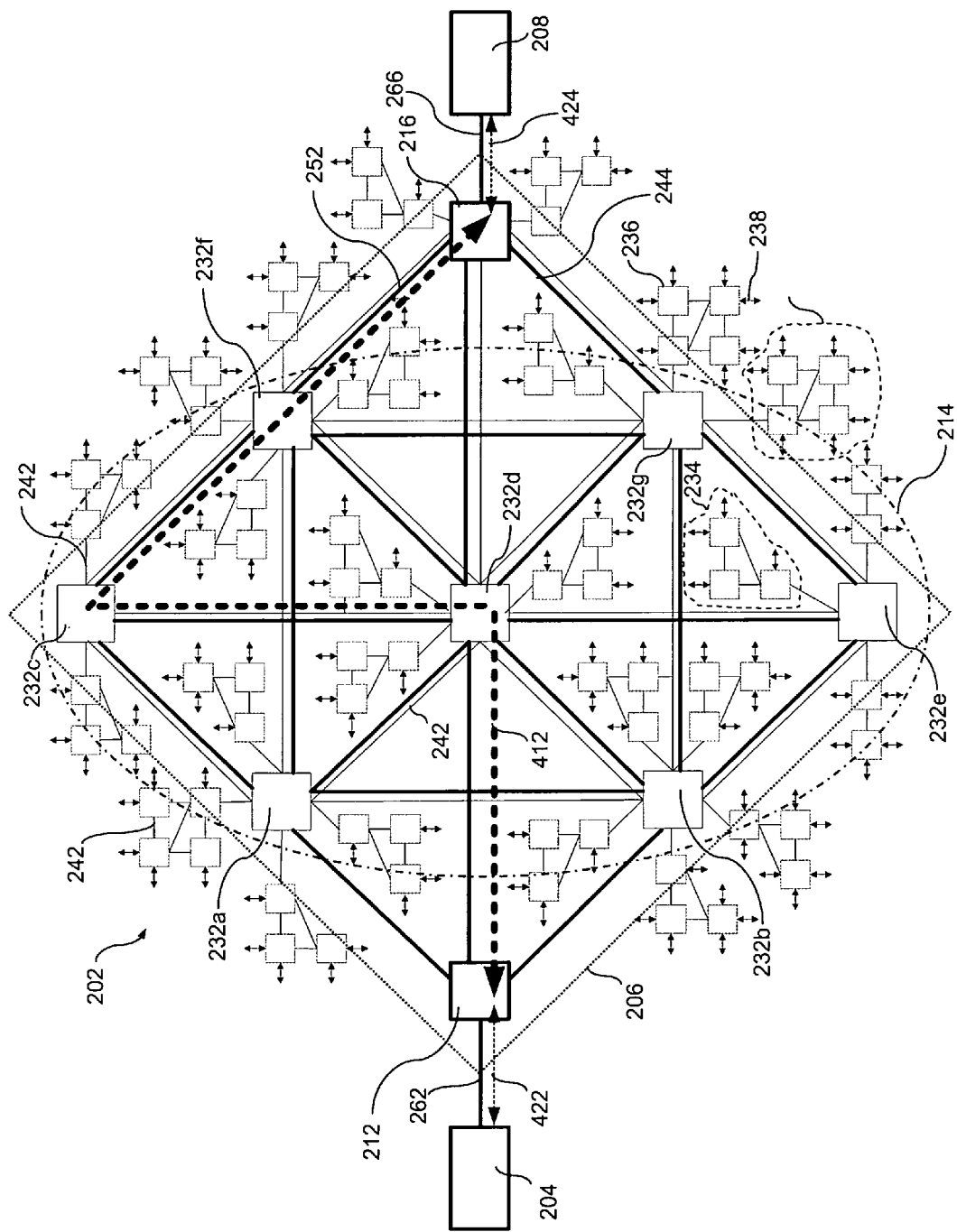
FIG. 4 is a schematic diagram of part of the secure geo-location obscurity network of FIG. 2, showing an inside tunnel circuit from a destination/server to a source/client.

FIG. 4 shows an inside tunnel circuit, shown by thick dashed arrow 412, for high bandwidth private traffic that travels between source/client device 204 and destination/server 208 and uses some of the transit nodes (transit nodes 232d and 232c) used by the inside tunnel circuit of FIG. 2 as well as transit node 232g. As shown in FIG. 4, the high bandwidth secure traffic may travel in both directions between source/client device 204 and destination/server 208. High bandwidth secure traffic enters private ingress node 212 from source/client device 204 over private connection 262 as shown by thin dashed arrow 422. High bandwidth secure traffic is sent by public-private egress node 216 to destination server 208 over private connection 266 as shown by thin dashed arrow 424. In the tunnel circuit shown by thick dashed arrow 412, public-private transit node 232*d* is logically adjacent to public-private transit node 232*c*, public-private transit node 232*c* is logically adjacent to public-private transit nodes 232*d* and 232*f* and public-private transit node 232*f* is logically adjacent to public-private transit node 232*c*.

As can be seen in FIGS. 2, 3 and 4, there are many potential inside tunnel circuits for a given private transit node network between the source/client device to the destination/server and from the destination/server to the source/client device. There are also numerous other inside tunnel circuits that could be used in both directions between the client device and the destination/server. In addition, because each of the public-private transit nodes is logically connected/attached to each of the other public-private transit nodes, the inside tunnel circuits are not limited by the connections shown in FIGS. 2, 3 and 4. For example, from the drawings in FIGS. 2, 3 and 4 its appears that a tunnel circuit must include a connection from public-private transit node 232*d*, 232*f* or 232*g* to public-private egress node 216, because only these three nodes are shown connected to public-private egress node 216. However, this is the result of illustrating only some of the logical connections between the transit nodes, egress node and ingress node for simplicity of illustration. In fact, public-private transit nodes 232*a*, 232*b*, 232*c* and 232*e* are also logically connected/attached to private ingress node 212 and public-private egress node 216. Whether two nodes that are logically connected to each other are logically adjacent to each other in a given tunnel circuit is dependent on the particular sequence of nodes in that tunnel circuit. Also, although the inside tunnel circuits of FIGS. 2, 3 and 4 are each shown operating in only one direction from the source/client device to the destination server or from the destination server to the source client device, each of these inside tunnel circuits could operate in either direction, depending on whether the traffic originates at the source/client device or the destination server.

Figure 5:
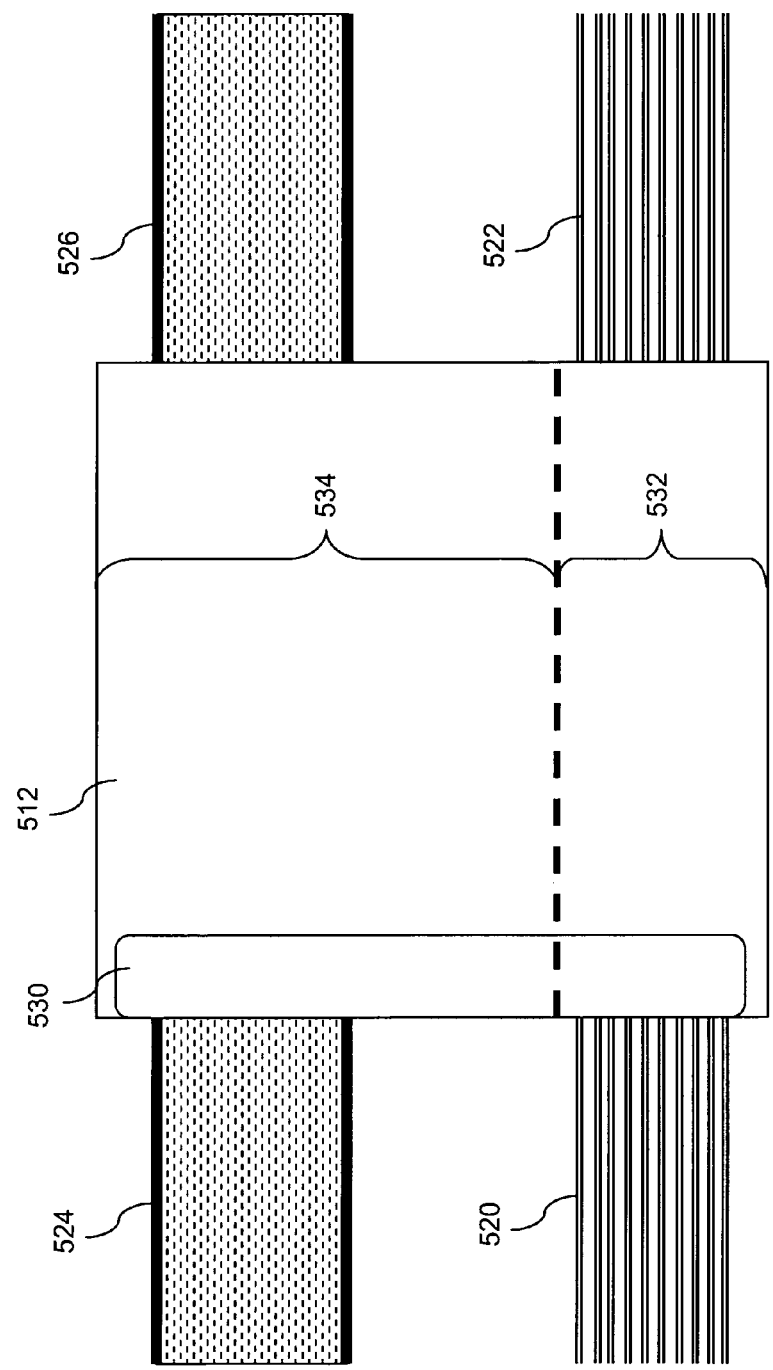
FIG. 5 is a schematic diagram of a public-private node according to one embodiment of the present invention.
Figure 6:
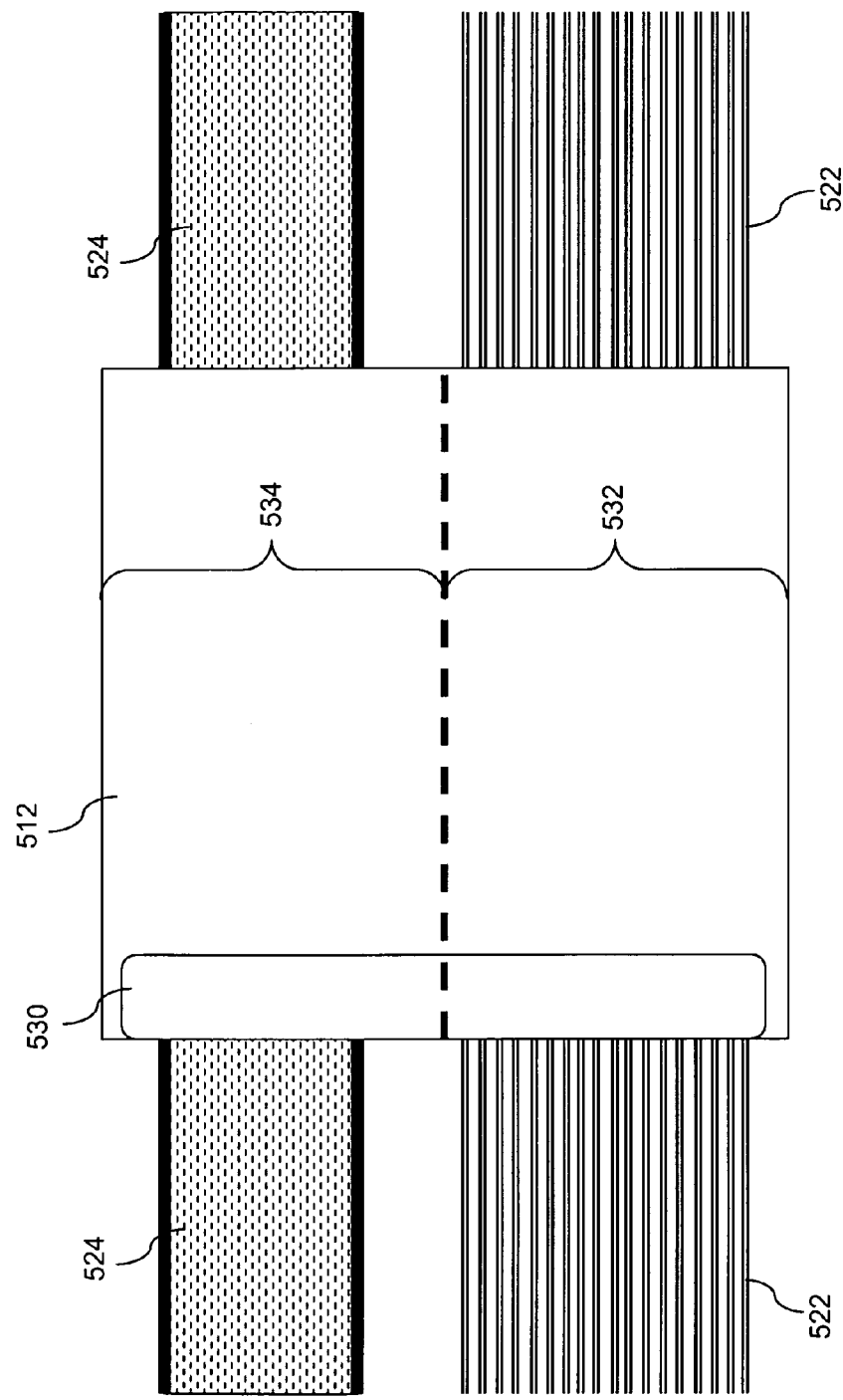
FIG. 6 is a schematic diagram of the public-private node of FIG. 5 illustrating the operation of a throttle for the node.

FIG. 5 shows a public-private node 512 according to one embodiment of the present invention. Public-private node 512 may be either a transit node or an egress node, or both simultaneously. FIG. 5 includes many low-bandwidth public traffic connections 520 and 522 that connect to public-private node 512, only a small fraction of which are shown for simplicity of illustration. A combination of low-bandwidth public traffic connection 520 and low-bandwidth public traffic connection 522 form a low-bandwidth public pathway through public-private node 512 for public traffic, i.e., public traffic is received and sent by public-private node 512 using low-bandwidth public traffic connection 520 and 522. High-bandwidth private traffic connections 524 and 526 are also connected to public-private node 512. Together, high-bandwidth private traffic connections 524 and 526 provide a high-bandwidth private pathway through public-private node 512, i.e., private traffic is sent and received by public-private node 512 using private traffic connections 524 and 526. Public-private node 512 includes a throttle 530 that controls the bandwidth allotted to, and number of simultaneous connections allowed, to public portion 532 of public-private node 512. Thereby, throttle 530 also controls the size of a high bandwidth private portion 534 of public-private node 512. The initial sizes of low bandwidth public portion 532 and high bandwidth private portion 534 may be set before or after public-private node 512 is connected to a private transit node network. In general, throttle 530 ensures that bandwidth allocated to private portion 534 is sufficient that private traffic may pass through public-private node 512 unimpeded. Throttle 530 may allow for additional bandwidth to be allocated to low bandwidth public portion 532, if high-bandwidth private traffic 524 and 526 pathway does not require the additional bandwidth. Such a reallocation of bandwidth is shown in FIG. 6.

Low-bandwidth public traffic interfaces 520 and 522 are each capable of being used to send and receive low-bandwidth public traffic. High-bandwidth private traffic interfaces 524 and 526 are each capable of being used to send and receive high-bandwidth private traffic.

Figure 7:
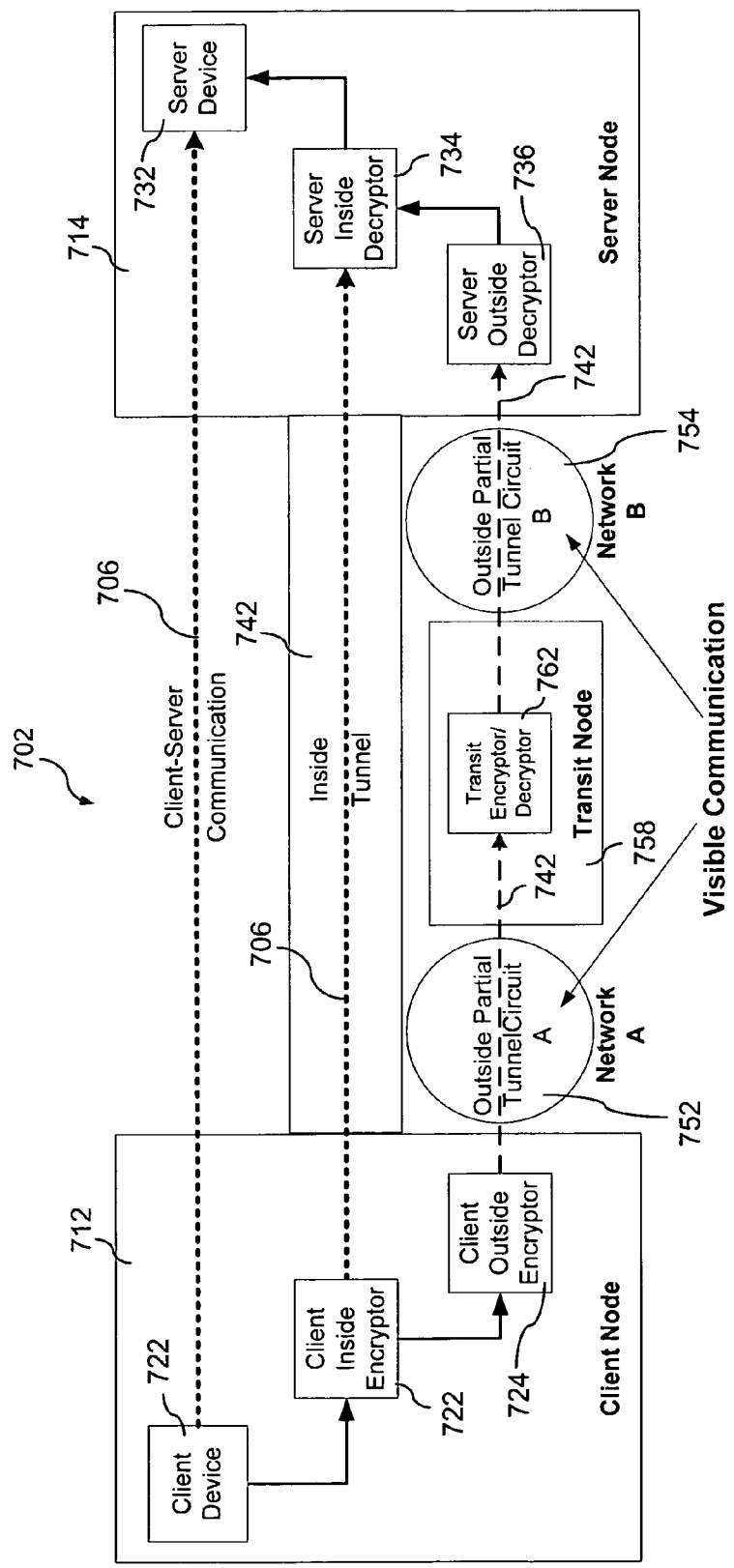
FIG. 7 is a schematic diagram illustrating how secure double tunneling works in a secure geo-location obscurity network.

The throttle of the present invention may operated to adjust the size of the public portion of a node by limiting the number of new connections to that node and/or limiting the network resources that can be consumed by new connections. FIG. 7 shows how secure double tunneling works in a secure geo-location obscurity network, SGLON 702, according to one embodiment of the present invention. Double tunneling serves the purpose of concealing a client-server communication 706 between a client node 712 and a server node 714. Client node 712 includes a client device 722, a client inside encryptor 724, and a client outside encryptor 726. Server node 714 includes a server device 732, a server inside decryptor 734, and a server outside decryptor 736. As shown in FIG. 7, client-server communication 706 between client node 712 and server node 714 is encapsulated between client inside encryptor 724 and server inside decryptor 734 using inside tunnel 742. When a client communication from client device 722 is received by client inside encryptor 724, client inside encryptor 724 initiates inside tunnel 742 between client inside encryptor 724 and server inside decryptor 734. Inside tunnel 742 conceals client-server communication 706 using encryption. The objective of concealing client-server communication 706 is further accomplished by encapsulating inside tunnel 742 inside an additional layer of tunneling by means of a pair of encrypted outside partial tunnel circuits 752 and 754 for two networks, Network A and Network B, respectively. As shown in FIG. 7, Network A represents the communication network between client node 712 and transit node 758, and Network B represents the separate communication network between transit node 758 and server node 714. Transit node 758 separates outside partial tunnel circuit 752 and outside partial tunnel circuit 754 in order to conceal inside tunnel 742. Inside tunnel 742 is concealed because it is encapsulated within outside partial tunnel circuits 752 and 754. Therefore, the only visible communication is between client node 712 and transit node 758, and transit node 758 and server node 714, as shown. Outside partial tunnel circuit 752 is initiated at client node 712 by client outside encryptor 726. Outside partial tunnel circuit 752 is terminated at transit node 758 by transit encryptor/decryptor module 762. Transit node encryptor/decryptor module 762 in turn initiates outside partial tunnel circuit 754 to server node 714 and server outside decryptor 736. Once outside partial tunnel circuit 754 is decrypted by server outside decryptor 736, inside tunnel 742 is in turn decrypted by the server inside decryptor 734. Client-server communication from client device 722 then arrives the server device 732 unencrypted.

Each of the modules of the secure geo-location obscurity network of FIG. 7 comprises hardware and/or software.

The traffic of the present invention is hidden from public view by a "double tunnel." The first of the "tunnels" of the "double tunnel" is the "inside tunnel," i.e., the inside tunnel that defines a pathway through the public-private transit nodes. The inside tunnel may also be referred to as an "egress tunnel." The second of the tunnels is an outside tunnel or "outer tunnel" formed by the pair of outside partial tunnel circuits. In a shared network environment, the source and destination information of each outside tunnel circuit can be seen by any entity with visibility into the network. However, the inside tunnel, and accordingly, the communication between the client and server, is completely encapsulated within the outside tunnel formed by the outside tunnel circuits. Because the direct connection between the client and server is not directly associated with the outside tunnel circuits, the direct connection is not visible or reconcilable to the outside world.

Although the ingress node is shown being part of client device in FIG. 7, the ingress node may be a separate device that is connected to the client device/client node. Although the egress node is shown being part of the server device in FIG. 7, the egress node may be a separate device that is connected to the server/server node.

Figure 8:
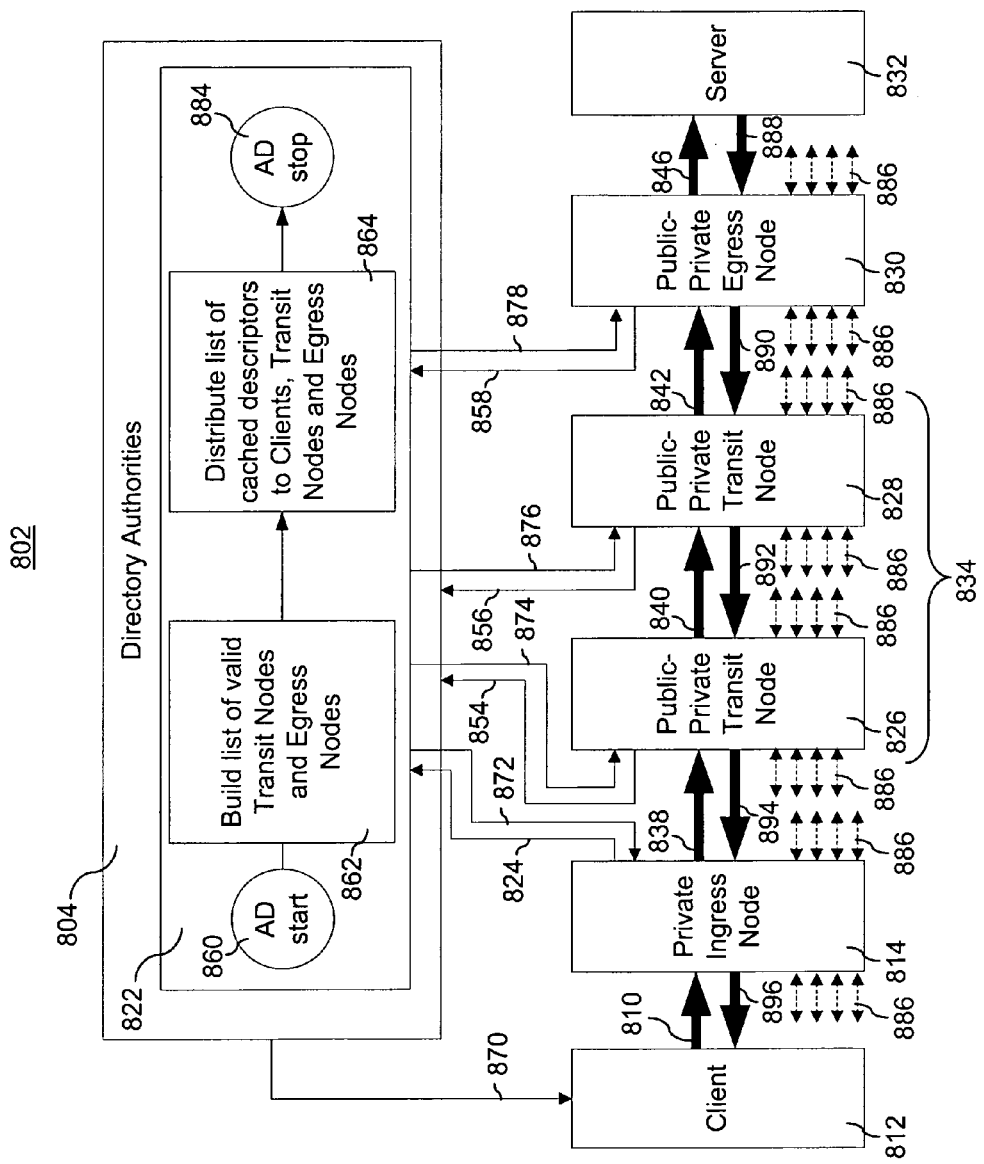
FIG. 8 is a schematic diagram illustrating end-to-end communication and data flow through a secure geo-location obscurity network according to one embodiment of the present invention.

FIG. 8 shows an overview of end-to-end communication and data flow through a Secure Geo-Location Obscurity Network, SGLON 802, according to one embodiment of the present invention. SGLON 802 includes directory authorities 804. A client communication, indicated by arrow 810, is received from client 812 by a private ingress node 814. Private ingress node 814 queries a directory authority node 822 of directory authorities 804 with a query, as indicated by arrow 824, to determine the valid transit nodes, i.e., public-private transit node 826, public-private transit node 828 and public-private egress node 830, to use in forwarding the client communication securely to a destination server 832. Directory authority node 822 determines the valid transit nodes and egress node, i.e., public-private transit nodes 826 and 828 and public-private egress node 830, that are part of a tunnel circuit 834 for the client communication. Once private ingress node 814 obtains the aforementioned information from directory authority node 822, as indicated by arrow 836, private ingress node 814 forms an encrypted circuit segment with a valid transit node, i.e., public-private transit node 826, as indicated by thick arrow 838. From public-private transit node 826, the client communication is securely forwarded, as indicated by thick arrow 840, to public-private transit node 828. From public-private transit node 828, the client communication is securely forwarded, as indicated by thick arrow 842, to public-private egress node 830. Upon reaching public-private egress node 830, the communication is ultimately decrypted and forwarded, as indicated by thick arrow 846, to destination server 832. Before directory authority node 822 can determine that transit node 826 and public-private transit node 828 may be part of tunnel circuit 834, public-private transit node 826 and public-private transit node 828 must introduce themselves to directory authority node 822, as shown by arrows 854 and 856. Public-private egress node 830 queries directory authority node 822 with a query, as indicated by arrow 858, to confirm that public-private transit node 828, the last transit node in tunnel circuit 834 before public-private egress node 830, is a valid transit node.

FIG. 8 also shows the operation of directory authority node 822. Upon receiving the queries from private ingress node 814 and public-private egress node 830, a list building module of directory authority node 822 activates at step 860 and compiles a random route path listing of valid nodes at step 862. The random route path listing will include private ingress node 814, public-private transit node 826, public-private transit node 828 and public-private egress node 830. Also in response to these queries, directory authority node 822 distributes cached descriptors for the random route path listing at step 864. In FIG. 8, this distribution of cached descriptors to client 812, private ingress node 814, public-private transit node 826, public-private transit node 828 and public-private egress node 830 is shown by arrows 870, 872, 874, 876 and 878, respectively. The cached descriptors distributed to client 812, private ingress node 814, public-private transit node 826, public-private transit node 828 and public-private egress node 830, respectively, provide only information about nodes that are logically adjacent in the tunnel circuit to the node receiving the cached descriptors. For example, the cached descriptors distributed to client 812 inform client 812 that the logically adjacent valid ingress node for the current private communication is private ingress node 814. The cached descriptors distributed to private ingress node 814 inform the private ingress node 814 that the next in line logically adjacent valid node for the current communication is public-private transit node 826. The cached descriptors distributed to public-private transit node 826 inform public-private transit node that the previous in line logically adjacent valid node for the current communication is private ingress node 814 and that the next in line logically adjacent valid node for the current communication is public-private transit node 828. The cached descriptors distributed to public-private transit node 828 inform public-private transit node that the previous in line logically adjacent valid node for the current communication is public-private transit node 826 and that the next in line logically adjacent valid node for the current communication is public-private egress node 830. The cached descriptors distributed to public-private egress node 830 inform public-private egress node 830 that the previous in line logically adjacent valid node is public-private transit node 828 and that the next in line logically adjacent node is server 832.

At step 884, directory authority node 822 returns to a ready state until the tunnel circuit process is started again by receiving a query from an ingress node. Each of the modules of the directory authority node 822 comprises hardware and/or software.

Public-private transit node 826, public-private transit node 828 and public-private egress node 830 are also connected to public circuits, shown by double-headed arrows 886.

Thick arrows 888, 890, 892, 894, 896 and 898 show secure communication from server 832 back to client 812.

For simplicity of illustration, only two transit nodes are shown in FIG. 8. However, in a Secure Geo-Location Obscurity Network of the present invention, there may be many transit nodes that are part of a tunnel circuit, so that the secure communication travels through a number of public-private transit nodes between the private ingress node and a given public-private egress node.

For simplicity of illustration, only one destination/server is shown in FIG. 8. However, in a Secure Geo-Location Obscurity Network of the present invention, there may be multiple destinations/servers. Therefore, the destination/server of FIG. 8 may be one of a number of destinations/servers.

Figure 9:
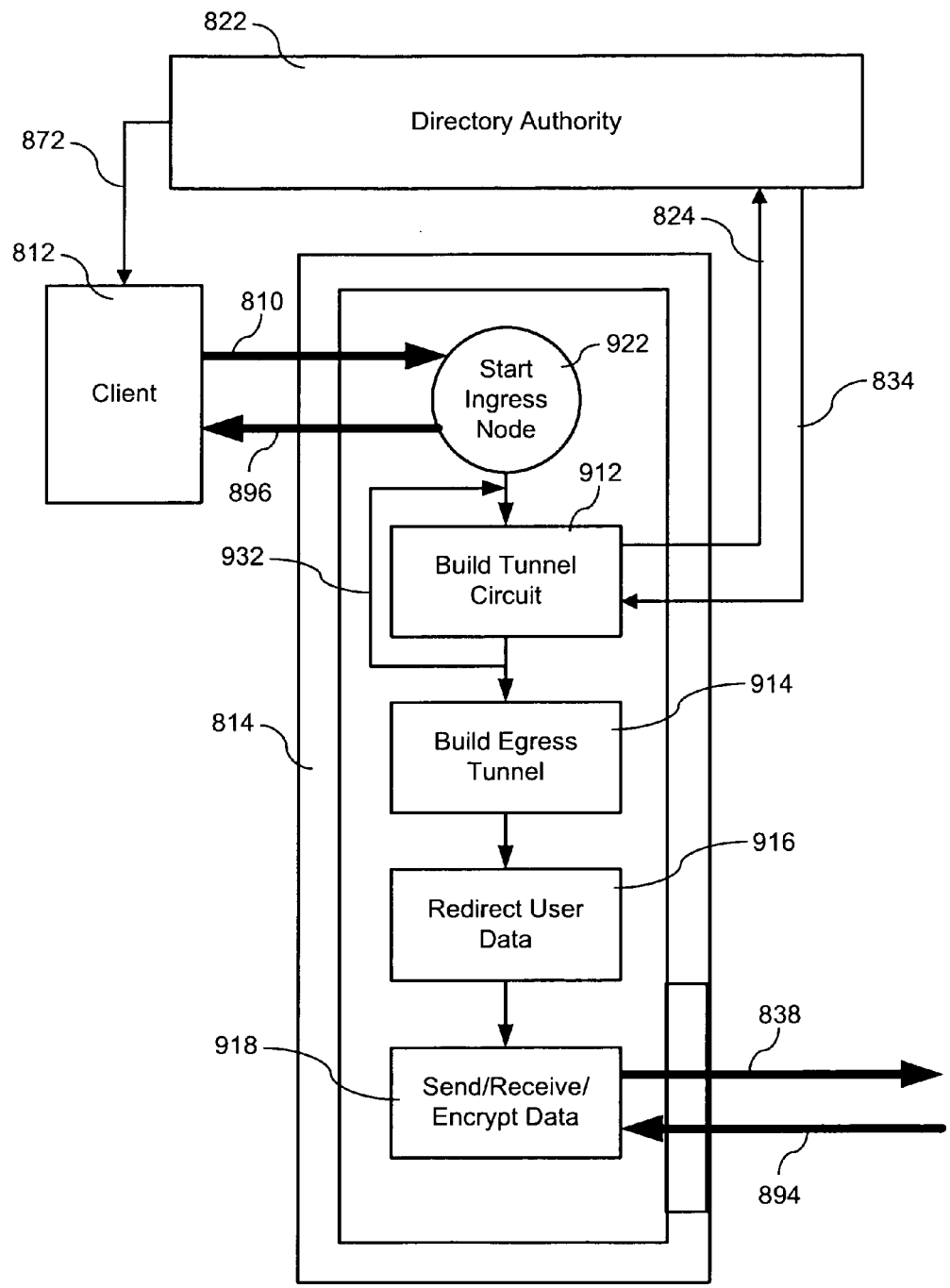
FIG. 9 is a schematic diagram illustrating the operation of a private ingress node of the secure geo-location obscurity network of FIG. 8.

FIG. 9 shows the operation of private ingress node 814. Private ingress node 814 includes a tunnel circuit builder module 912, an egress tunnel builder module 914, an ingressing user data redirection module 916 and a send/receive module 918. Tunnel circuit module 912, egress tunnel builder module 914, ingressing user data redirection module 916 and send/receive module 918 may each comprise hardware and/or software.

Upon receiving the client communication from client 812, private ingress node 814 is activated at step 922. Tunnel circuit builder module 912 builds a tunnel circuit, such as tunnel circuit 834, based on information from directory authority node 822. The tunnel circuit is the "outer tunnel" of the double tunnel SGLON 802. Private ingress node 814 introduces itself to directory authority node 822 and queries directory authority node 822, as indicated by arrow 824. Based on the random route path listing of nodes for tunnel circuit 834 created by directory authority 822, directory authority 822 provides cached descriptors that identify public-private transit node as a logically adjacent and valid transit node. Tunnel circuit 834 is a random path ordering of some or all the valid transit nodes for SGLON 802 that client communication traverses to get to an egress node, such as public-private egress node 830. Tunnel circuit builder module 912 also forms a connection between each transit node, shown by arrow 840 in FIG. 8, to thereby form tunnel circuit 834. In one embodiment of the present invention, client 812 receives the public keys of each transit node of the tunnel circuit. If the tunnel circuit cannot be built, client 812 and tunnel circuit module 912 attempt to recreate the tunnel circuit again until successful, as indicated by arrow 932.

Upon completion of collecting the public keys and building the tunnel circuit, control passes to egress tunnel builder module 914. The egress tunnel builder module establishes a connection, shown by arrows 810, 838, 840, 842 and 846, between client 812 and server 832. Then send/receive module 918 sends the encrypted traffic through tunnel circuit 834 to public-private egress node 830 where the traffic is decrypted.

Each of the modules of the private ingress node 814 comprises hardware and/or software.

A user at the client device may assign a maximum duration for the tunnel circuit, and/or the tunnel circuit may have a default maximum duration. For example, if the user assigns a maximum duration of one (1) hour to the tunnel circuit, when the tunnel circuit has been active for one (1) hour, the client device and secure ingress mode will rebuild a new tunnel circuit using a new random route path listing. Before a new tunnel circuit is built, the user may be given the option to continue with the present tunnel circuit or to extend the maximum duration for the tunnel circuit.

Figure 10:
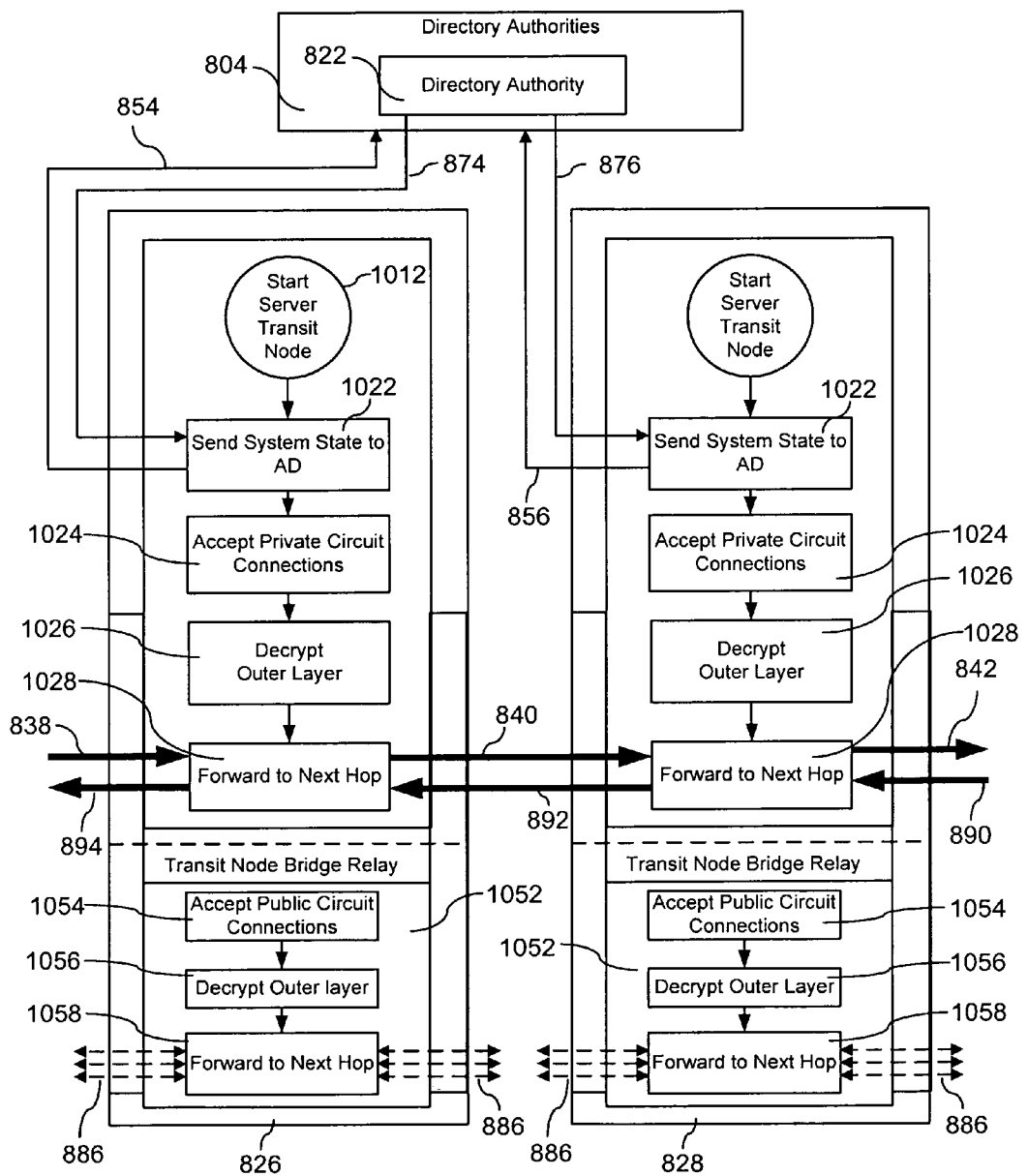
FIG. 10 is a schematic diagram illustrating the operation of two public-private transit nodes of the secure geo-location obscurity network of FIG. 8.

FIG. 10 shows logical data flow for transit nodes 826 and 828. When one of these transit nodes is activated at step 1012, a system state module 1022 of the transit node introduces the transit node to both public and private directory authorities, as indicated by arrows 854 and 856 for transit nodes 826 and 828, respectively. This introduction is necessary for each of the transit nodes to be able to receive obscurity protocol traffic. The information provided by system state module 1022 to the directory authorities 804 during this process includes characteristics such as transit node name, system uptime, bandwidth availability and public key. Once determined to be a legitimate transit node by directory authorities 804, transit nodes, such as transit nodes 826 and 828, will begin to be included in the circuit paths of both public and private circuits. Also, once determined to be a valid transit node, a circuit connection acceptance module 1024 of the valid transit node will begin accepting private connections. As tunnel circuit traffic arrives, a decryptor module 1026 decrypts the encrypted outer layer. If this decryption process is successful, the next hop of the packet is determined by forwarding module 1028 and the packet is forwarded to the next hop, as indicated by arrow 840 for the "next hop" from public-private transit node 826 to transit node 828 and as indicated by arrow 842 for the "next hop" from public-private transit node 828 to public-private egress node 830.

As shown in FIG. 10, public-private transit nodes 826 and 828 also each include a transit node bridge relay 1052. Transit node bridge relay 1052 includes an accept public circuit connections module 1054, a data decryption module 1056 and a forwarding module 1058. Accept public circuit connections module 1054 accepts public circuits that pass through a portion of the transit node allocated to public traffic. Data decryption module 1056 decrypts the outer layer of the public traffic. Forwarding module 1058 then sends data to and receives data from the public circuits connected to the transit node (public-private transit node 826 or 828), as indicated by double-headed arrows 886.

Circuit connections module 1054 includes a component that determines whether a connection is to be accepted or not. This component acts as a throttle if the portion of the node allocated to public traffic needs to be increased to accept more public circuits.

Each of the modules of the public-private transit nodes 826 and 828 comprises hardware and/or software.

Figure 11:
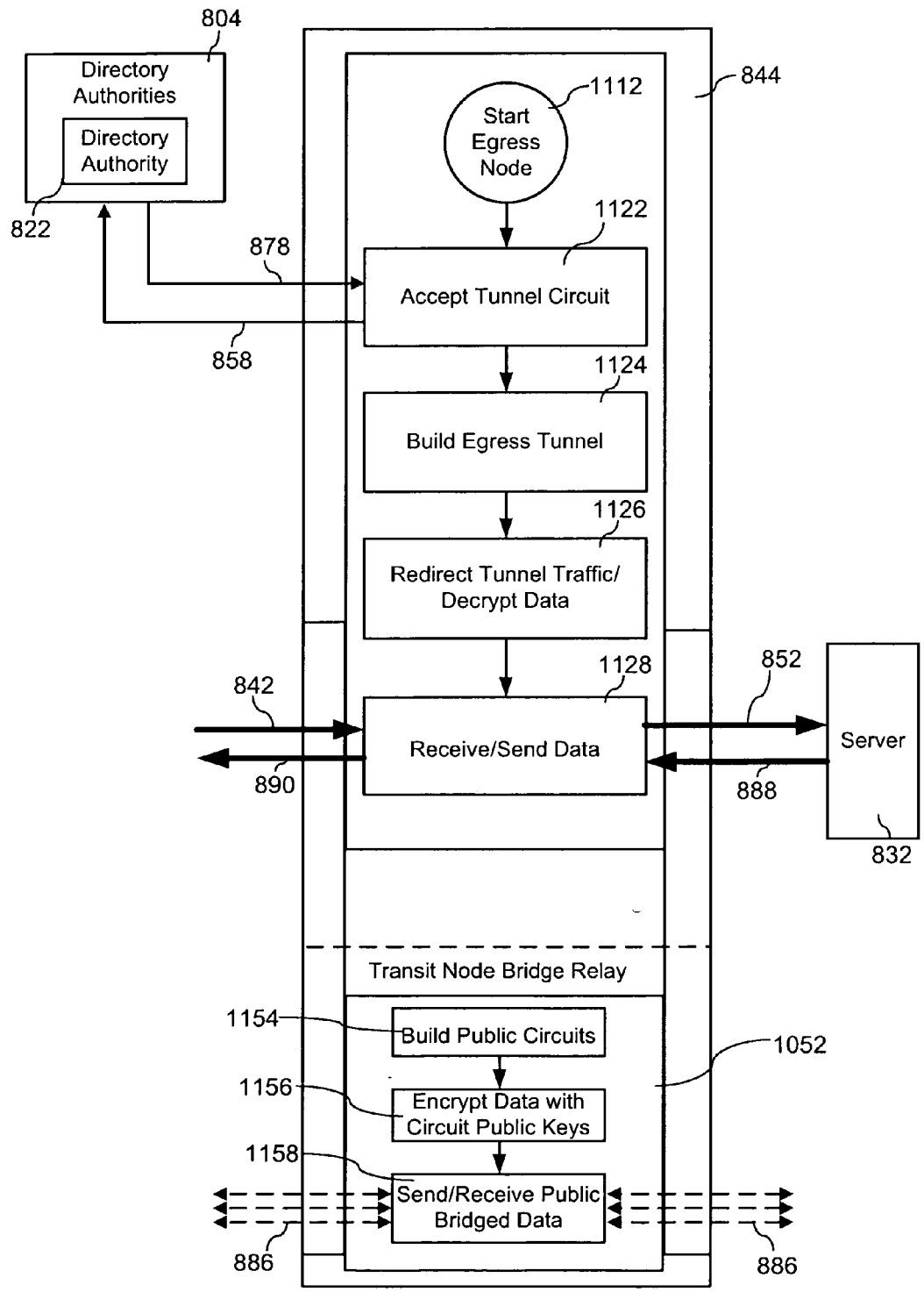
FIG. 11 is a schematic diagram illustrating the operation of a private egress node of the secure geo-location obscurity network of FIG. 8.

FIG. 11 shows logical data flow for public-private egress node 830. When public-private egress node 830 is activated at step 1112, a tunnel circuit screening module 1122 of public-private egress node 830 introduces itself to directory authority node 822 of directory authorities 824 as indicated by arrow 858. Arrow 858 also shows public-private egress node 830 querying directory authority node 822 of directory authorities 804 with a query for cached descriptors for the previous in-line logically adjacent valid transit node, transit node 828 in FIG. 8, and for the server, server 832 in FIG. 8, to which the current communication is to be sent. In response to this query, directory authority node 822 provides the requested information as indicated by arrow 878. Tunnel circuit screening module 1122 then checks the descriptors of the previous in line logically adjacent transit node for the potential incoming tunnel circuit against the cached descriptors for the previous in line logically adjacent transit node received from directory authority node 822. If public-private egress node 830 will allow the tunnel circuit (tunnel circuit 834 in FIG. 8) to be built, tunnel circuit screening module 1122 will send the public key to private ingress node 814 through tunnel circuit 834. Control is then passed to an egress tunnel building module 1124 to begin building the egress tunnel. Egress tunnel building module 1124 also includes a decryption module that decrypts the encrypted traffic from the tunnel circuit to form decrypted traffic. The egress tunnel is the "inner tunnel" of the double tunnel SGLON 802. Once the egress tunnel is built, egressing traffic redirection module 1126 redirects the decrypted traffic from the tunnel circuit to the egress tunnel. A send/receive module 1128 sends the decrypted traffic to server 832 through the egress tunnel.

As shown in FIG. 11, public-private egress node 830 also includes an egress node bridge relay 1152 that functions in the same way as transit node bridge relay 1142. Egress node bridge relay 1152 includes a public circuit building module 1154, a data encryption module 1056 and a send/receive module 1158. Public circuit building module 1154 builds public circuits that pass through a portion of public-private egress node 830 allocated to public traffic. Data encryption module 1156 encrypts the public traffic/data that travels in the public circuit with circuit public keys. Send/receive module 1158 then sends and receives data to public circuits, shown by double-headed arrows 886.

Each of the modules of the public-private egress node 830 comprises hardware and/or software.

Figure 12:
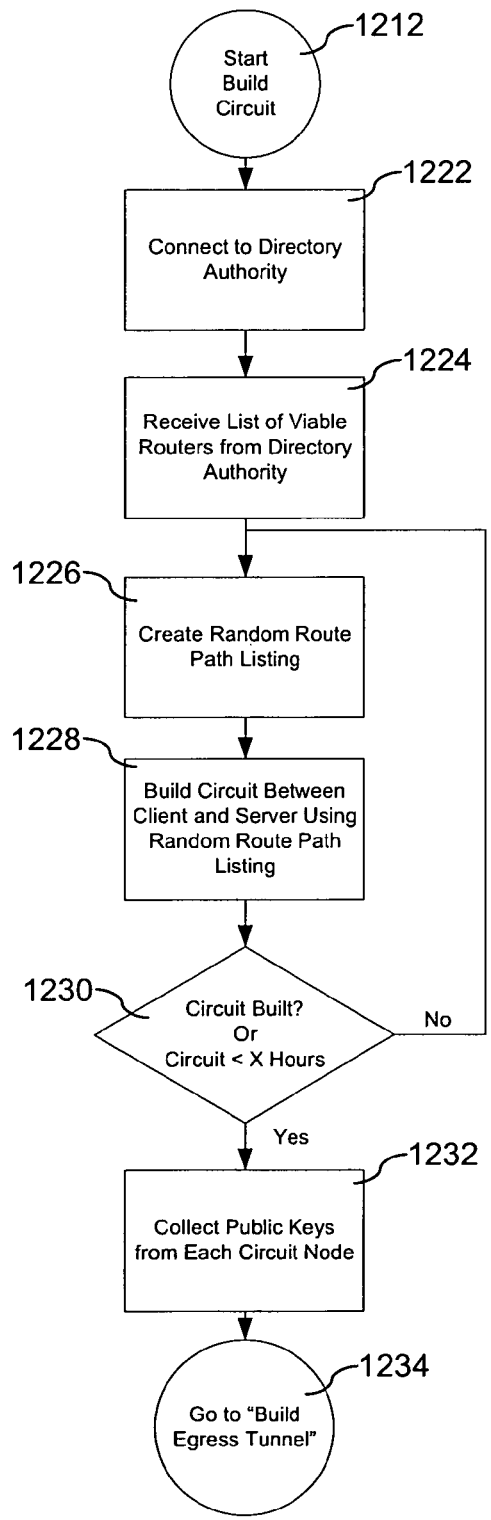
FIG. 12 is a flowchart illustrating the operation of a tunnel circuit builder module of the private ingress node of FIG. 9.

FIG. 12 shows the operation of tunnel circuit builder module 912 of private ingress node 814. After activating at step 1212, tunnel circuit builder module 912 connects to directory authority node 822 at step 1222. At step 1224, tunnel circuit builder module 912 receives a random route path listing of valid/viable transit nodes/routers from directory authority node 822. At step 1226, tunnel circuit builder module 912 then creates a random route path listing using at least some of the valid/viable transit nodes by randomly picking which valid transit nodes to hop through based on a random number generator that is part of the operating system for directory authority node 822. The random route path listing will be used to build a tunnel circuit, such as tunnel circuit 834, which is a random path of hops from public-private transit node to public-private transit node through each of the selected public-private transit nodes that will connect private ingress node 814 to public-private egress node 830.

Based on the random route path listing, directory authority node 822 provides cached descriptors to public-private egress node 830, as shown by arrow 878, that allow public-private egress node 830 to confirm that public-private transit node 828, the previous in line logically adjacent transit node to public-private egress node 830, is valid. At step 1228, tunnel circuit builder module 912 builds a tunnel circuit between client 812 and server 832 based on the random route path listing. The tunnel circuit is built by each node in the tunnel circuit confirming that the previous in line and next in line logically adjacent nodes to that node are valid. In this way the tunnel circuit is "anonymous" because the information about the entire random route path listing cannot be obtained from directory authority node 822 or from any of the nodes that are part of the random route path listing. Directory authority node 822 does not store the random route path listing, and the nodes that are part of the random route path listing have information about only one or two logically adjacent nodes in the random route path listing.

If, for any reason, the tunnel circuit cannot be built, at step 1230 the tunnel building process returns to step 1226 so the tunnel circuit builder module 912 can create a new random route path listing. Also, if the tunnel circuit has existed beyond its maximum allowed duration (the tunnel circuit has existed for X or more hours), at step 1230 the tunnel building process returns to step 1226 so the tunnel circuit can create a new random route path listing. If the tunnel circuit can be built at step 1230, control is passed to step 1232. Also, for an existing tunnel circuit, if the maximum duration of the tunnel circuit has not been reached (X is less than X hours), control is passed to step 1232. At step 1232, tunnel circuit builder module 912 collects the public keys from each transit node in the tunnel circuit and transfers the public keys to the private ingress node where they are stored on one or more storage media. Control is then passed to egress tunnel builder module 914 at step 1234.

Figure 13:
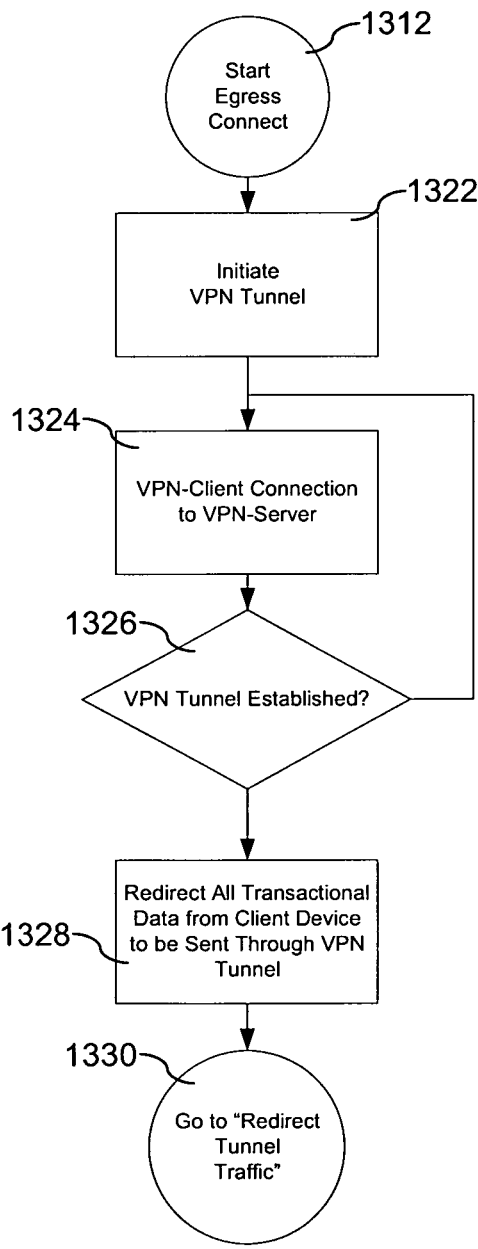
FIG. 13 is a flowchart illustrating the operation of an egress tunnel builder module of the private ingress node of FIG. 9.

FIG. 13 shows the operation of egress tunnel builder module 914 of private ingress node 814. After activating at step 1312, at step 1322 egress tunnel builder module 914 initiates an egress tunnel (VPN tunnel). At step 1324, egress tunnel builder module 914 establishes an egress tunnel between client 812 and server 832. At step 1326, if the egress tunnel is not established, control is returned to step 1324, where egress tunnel builder module 914 attempts to once again establish an egress tunnel between client 812 and server 832. Once the egress tunnel is established at step 1326, secure traffic/data from client 812 to be sent to the egress tunnel (VPN tunnel) is redirected/rerouted at step 1328. Control is then passed to ingressing user data redirection module 916 at step 1330.

Figure 14:
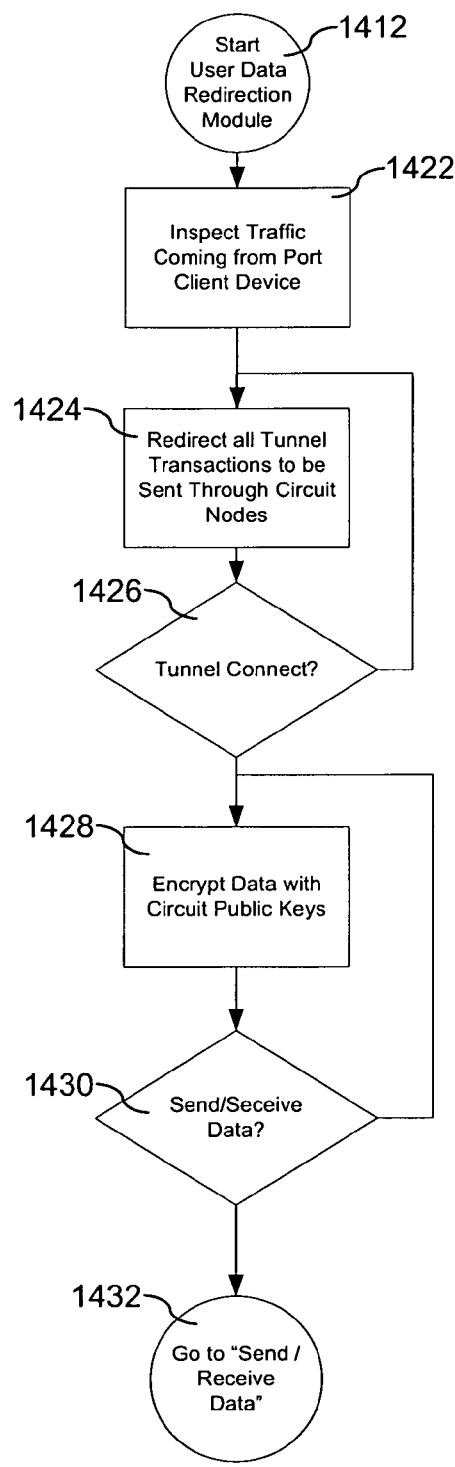
FIG. 14 is a flowchart illustrating the operation of an ingressing traffic redirection module of the private ingress node of FIG. 9.

FIG. 14 shows the operation of ingressing user data redirection module 916 of private ingress node 814. After activating at step 1412, ingressing traffic redirection module 916 inspects incoming traffic/data from client 812 at step 1422. At step 1424, ingressing traffic redirection module 916 redirects the traffic/data so that the traffic/data is sent through the tunnel circuit built by tunnel circuit builder module 912. If connection to the tunnel circuit cannot be established by ingressing user data redirection module 916 at step 1426, control is returned to step 1424 and ingressing user data redirection module 916 attempts to reconnect to the tunnel circuit. Once a connection to the tunnel circuit is established at step 1426, the traffic is encrypted by ingressing user data redirection module 916 using the public keys from the transit nodes collected by tunnel circuit builder module 912 at step 1428. If tunnel circuit module 912 determines at step 1430 that there is still additional traffic to encrypt, control is returned to step 1428 until all of the traffic is encrypted. Once all of the traffic is encrypted, control is passed to send/receive module 918 at step 1432.

FIG. 15 shows the operation of system state module 1022 of public-private transit nodes 826 and 828. After activating at step 1512, system state module 1022 determines the directory authority with which the transit node will communicate at step 1522. System state module 1022 then connects to a directory authority, such as directory authority 822, at step 1524. System state module 1022 then sends a list of description attributes to the directory authority at step 1526. The information provided by system state module 1022 to the directory authority during this process includes characteristics such as transit node name, system uptime, bandwidth availability and public key. After providing this information to the directory authority, control passes to circuit connection acceptance module 1024 at step 1528.

FIG. 16 shows the operation of circuit connection acceptance module 1024 of public-private transit nodes 826 and 828. After activating at step 1612, circuit connection acceptance module 1024 "listens," i.e., keeps a port of the transit node (public-private transit node 826 or 828) open for tunnel circuit service requests at step 1622. Upon receiving a tunnel circuit service request at step 1624, control passes to decryptor module 1026 at step 1624.

FIG. 17 shows the operation of decryptor module 1026 of public-private transit nodes 824 and 828. After activating at step 1712, decryptor module 1026 decrypts the tunnel circuit header for an incoming tunnel circuit packet (incoming traffic from the tunnel circuit) at step 1722. Decryptor 1026 then determines if the tunnel circuit packet is valid at step 1724. If the tunnel circuit packet is not valid, the tunnel circuit packet is discarded at step 1726. If the tunnel circuit packet is valid, control passes to forwarding module 1028 at step 1726.

FIG. 18 shows the operation of forwarding module 1028 of public-private transit nodes 826 and 828. After activating at step 1812, forwarding module 1028 determines the next hop for the tunnel circuit at step 1822. Forwarding module 1028 then determines if the next hop is routable at step 1824. If the next hop is not routable, the tunnel circuit packet is discarded at step 1826. If the tunnel circuit packet is routable, the tunnel circuit packet is forwarded to the next hop at step 1826. The next hop may be to either another transit node or to the egress node for the tunnel circuit. For example, in FIG. 8, the next hop for transit node 826 is transit node 828 and the next hop for transit node 828 is egress node 830.

Figure 19:
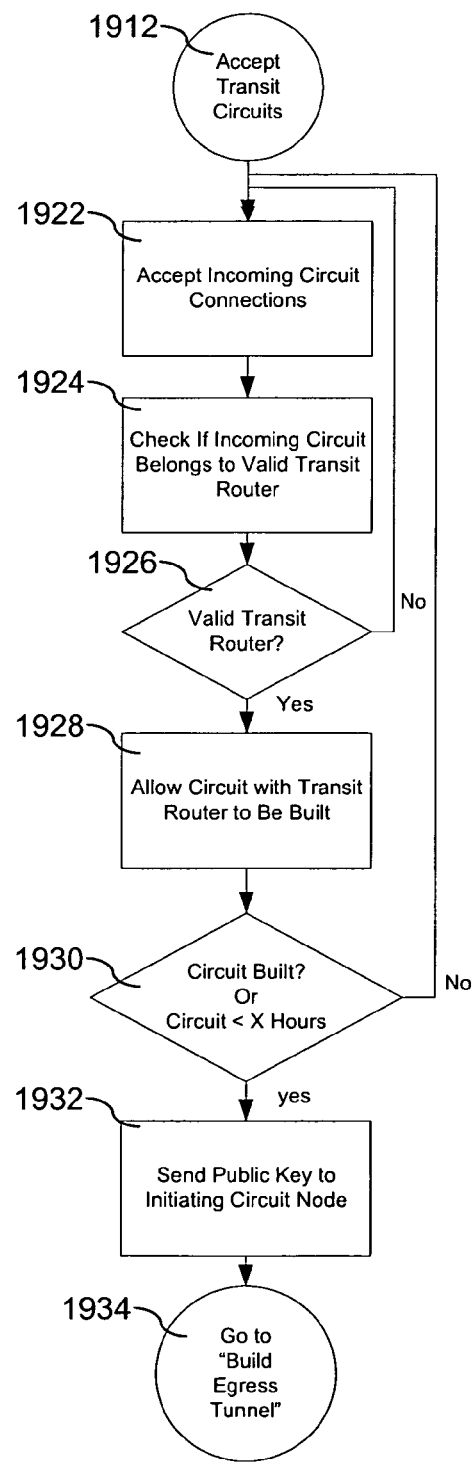
FIG. 19 is a flowchart illustrating the operation of a tunnel circuit screening module of the private egress node of FIG. 11.

FIG. 19 shows the operation of tunnel circuit screening module 1122 of public-private egress node 830. After activating at step 1912, tunnel circuit screening module 1122 of public-private egress node 830 accepts incoming circuit connections at step 1922. Tunnel circuit screening module 1122 then checks an incoming tunnel circuit that includes only valid nodes at step 1924. If one or more of the transit nodes in the incoming tunnel circuit is determined by tunnel circuit screening module 1122 not to be valid at step 1926, control is returned to step 1922. Also, if the tunnel circuit has existed beyond its maximum allowed duration (the tunnel circuit has existed for X or more hours) at step 1926, control is returned to step 1922. If all of the transit nodes in the tunnel circuit determined by tunnel circuit screening module 1122 to be valid at step 1926, the tunnel circuit screening module 1122 allows the tunnel circuit to be built and control is passed to step 1928. Also, for an existing tunnel circuit, if the maximum duration of the tunnel circuit has not been reached (X is less than X hours), control is passed to step 1928. The maximum duration, X hours, may be set using a configuration file. At step 1928, tunnel circuit screening module 1122 sends the public key to private ingress node 814 (the initiating circuit node). Control is then passed to egress tunnel building module 1124 at step 1234.

Figure 20:
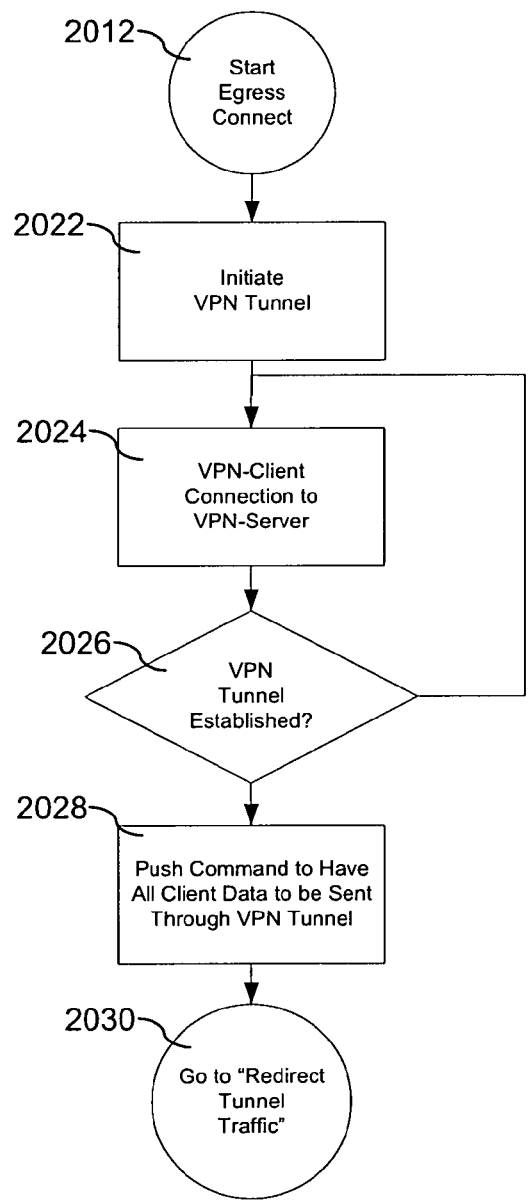
FIG. 20 is a flowchart illustrating the operation of an egress tunnel building module of the private egress node of FIG. 11.

FIG. 20 shows the operation of egress tunnel building module 1124 of public-private egress node 830. After activating at step 2012, egress tunnel building module 1124 of public-private egress node 830 initiates the build process for the VPN tunnel (egress tunnel) at step 2022. Egress tunnel building module 1124 attempts to receive incoming client requests at step 2024. If the egress tunnel connection is determined to be unsuccessful by egress tunnel building module 1124 at step 2026, control returns to step 2022. If the egress tunnel connection is determined to be successful by egress tunnel building module 1124 at step 2026, then at step 2028 egress tunnel building module 1124 pushes instructions on how to redirect the traffic to server 832 back to client 812 through tunnel circuit 834. Control then passes to egressing traffic redirection module 1126 at step 2030.

Figure 21:
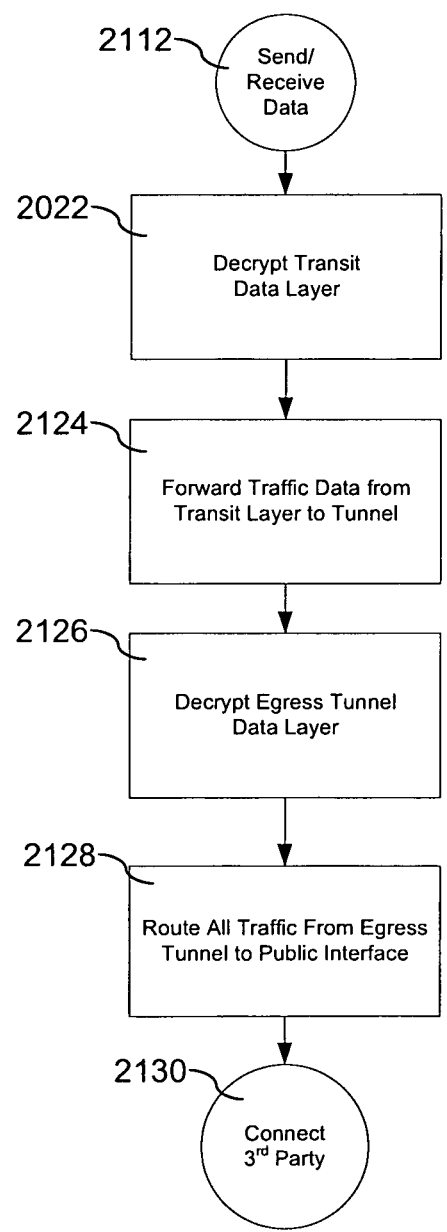
FIG. 21 is a flowchart illustrating the operation of an egressing traffic redirection module and a send/receive module of the private egress node of FIG. 11.

FIG. 21 shows the operation of egressing traffic redirection module 1126 and send/receive module 1128 of public-private egress node 830. After activating at step 2012, egressing traffic redirection module 1126 of public-private egress node 830 decrypts the transit circuit layer (outer-tunnel) at step 2122. After decrypting the transit circuit layer, egressing traffic redirection module 1126 forwards transit circuit packets (traffic) to the egress tunnel at step 2124. Egressing traffic redirection module 1126 then decrypts the packets (inner-tunnel) at step 2126. Egressing traffic redirection module 1126 then routes the traffic from the egress tunnel to send/receive module 1128 at step 2028. Send/receive module 1128 then communicates with the third-party communications systems at step 2130.

While the present invention has been disclosed with reference to certain embodiments, numerous modifications, alterations and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
   a node for a network, wherein the node is a public-private node comprising:
      a private portion for allowing high bandwidth secure private traffic to be received and transmitted by the node on a private pathway through the node; and
      a public portion for allowing low bandwidth secure public traffic to be received and transmitted by the node on a plurality of public pathways through the node.

2. The device of claim 1, wherein the node comprises a throttle for controlling the size of the public portion of the node.

3. The device of claim 1, wherein the node is a transit node.

4. The device of claim 1, wherein the node is an egress node.

5. The device of claim 4, wherein the egress node is part of a server.

6. A device comprising:
   an ingress node comprising:
      a tunnel circuit builder module for building a tunnel circuit from the ingress node to an egress node;
      an ingressing user data redirection module for redirecting the traffic from a client node to the tunnel circuit and for encrypting the traffic to form encrypted traffic; and
      a send/receive module for sending traffic to and receiving traffic from the tunnel circuit;
   wherein the tunnel circuit comprises a random route path through a plurality of randomly selected public-private transit nodes.

7. The device of claim 6, wherein the traffic is encrypted by the using public keys from each of the public-private transit nodes.

8. The device of claim 6, wherein the ingress node is part of a client device comprising the client node.

9. The device of claim 6, wherein the device comprises the tunnel circuit.

10. The device of claim 6, wherein the device comprises the egress node and wherein the egress node comprises:
    an egress tunnel builder module for building an egress tunnel from a client node to a server node;
    an egressing tunnel traffic redirection module for redirecting the encrypted traffic from the tunnel circuit to the egress tunnel and for decrypting the encrypted traffic from the tunnel circuit; and
    a send/receive module for sending the decrypted traffic from the client node to the server node through the egress tunnel.

11. A device comprising:
    an egress node comprising:
       an egress tunnel builder module for receiving the request for building an egress tunnel from the egress node to a server node;
       a traffic redirection module for redirecting encrypted traffic from a tunnel circuit to the egress tunnel and for decrypting the encrypted traffic from the tunnel circuit; and
       a send/receive module for sending the decrypted traffic from the egress node to the server node through the egress tunnel.

12. The device of claim 11, wherein the egress node is part of a server comprising the server node.

13. The device of claim 11, wherein the traffic in decrypted by the traffic redirection module using public keys from each of the public-private transit nodes.

14. A method comprising the following steps:
    (a) forming a tunnel circuit from an ingress node to an egress node for traffic from a client node connected to the ingress node;
    (b) forming an egress tunnel from the egress node to a server for the traffic; and
    (c) transmitting the traffic from the client node to the egress node;
    wherein the tunnel circuit comprises a random route path through a plurality of randomly selected public-private transit nodes;
    wherein the egress tunnel is an inner tunnel of a double tunnel; and
    wherein the tunnel circuit is an outer tunnel of the double tunnel.

15. The method of claim 14, wherein the method comprises the following steps:
    (d) encrypting the traffic prior to the traffic entering the tunnel circuit; and
    (e) decrypting the traffic prior to the traffic entering the egress tunnel.

16. The method of claim 15, wherein the traffic in step (d) is encrypted using public keys from each of the public-private transit nodes.

17. The method of claim 16, wherein the traffic in step (e) is decrypted using public keys from each of the public-private transit nodes.

\* \* \* \* \*